(12) United States Patent
Wolfe et al.

(10) Patent No.: US 9,877,630 B2
(45) Date of Patent: Jan. 30, 2018

(54) WALL FOLLOWING ROBOT

(71) Applicant: iRobot Corporation, Bedford, MA (US)

(72) Inventors: Brian Wolfe, Somerville, MA (US); Ping-Hong Lu, Newton, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/946,500

(22) Filed: Nov. 19, 2015

(65) Prior Publication Data

US 2016/0299503 A1 Oct. 13, 2016

Related U.S. Application Data

(63) Continuation of application No. 14/682,760, filed on Apr. 9, 2015.

(51) Int. Cl.
*A47L 11/40* (2006.01)
*A47L 9/28* (2006.01)
(Continued)

(52) U.S. Cl.
CPC ......... *A47L 11/4011* (2013.01); *A47L 9/2805* (2013.01); *A47L 11/28* (2013.01);
(Continued)

(58) Field of Classification Search
None
See application file for complete search history.

(56) References Cited

U.S. PATENT DOCUMENTS 4,292,659 A 9/1981 Lao
4,897,914 A 2/1990 Loubier
(Continued)

FOREIGN PATENT DOCUMENTS

EP 1909630 B1 7/2014
WO 2006121805 A2 11/2006

OTHER PUBLICATIONS

Ishida et al., "Collision-Detecting Device for Omnidirectional Electric Wheelchair," Hindawi Publishing Corporation, vol. 2013, Article ID 672826, 8 pages, 2013.
(Continued)

*Primary Examiner* — Rami Khatib
*Assistant Examiner* — Nicholas K Wiltey
(74) *Attorney, Agent, or Firm* — Fish & Richardson P.C.

(57) ABSTRACT

An example robot includes a body that is movable relative to a surface, a bumper mounted on the body to enable movement of the bumper relative to the body, a sensor to produce a signal in response to the movement of the bumper relative to the body caused by contact between the bumper and the surface, and a controller to control movement of the body to cause the body to track the surface based on a value. The bumper is movable between an uncompressed position relative to the body and a compressed position relative to the body. The signal varies linearly with the movement of the bumper relative to the body. The value is based on the signal and indicates that the bumper in a partially compressed position has a compression range between the uncompressed position and the compressed position.

28 Claims, 17 Drawing Sheets

(51) Int. Cl.
*A47L 11/28* (2006.01)
*G05D 1/00* (2006.01)
*G05D 1/02* (2006.01)

(52) U.S. Cl.
CPC ....... *A47L 11/4061* (2013.01); *A47L 11/4088* (2013.01); *G05D 1/0088* (2013.01); *G05D 1/0219* (2013.01); *G05D 1/0259* (2013.01); *A47L 2201/00* (2013.01); *A47L 2201/04* (2013.01); *A47L 2201/06* (2013.01); *Y10S 901/01* (2013.01)

(56) References Cited

U.S. PATENT DOCUMENTS

| | | | |
|---|---|---|---|
| 5,446,445 A * | 8/1995 | Bloomfield | G08B 17/10 340/521 |
| 5,630,243 A | 5/1997 | Federico et al. | |
| 6,389,329 B1 | 5/2002 | Colens | |
| 6,491,998 B1 | 12/2002 | Heitz | |
| 6,532,404 B2 | 3/2003 | Colens | |
| 6,594,844 B2 | 7/2003 | Jones | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 7,137,169 B2 | 11/2006 | Murphy et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,620,476 B2 | 11/2009 | Ziegler et al. | |
| 7,636,982 B2 | 12/2009 | Jones et al. | |
| 7,761,954 B2 | 7/2010 | Ziegler et al. | |
| 7,891,898 B2 | 2/2011 | Hoadley et al. | |
| 8,387,193 B2 | 3/2013 | Ziegler et al. | |
| 8,670,866 B2 | 3/2014 | Ziegler et al. | |
| 8,739,355 B2 | 6/2014 | Ziegler et al. | |
| 8,774,966 B2 | 7/2014 | Ziegler et al. | |
| 8,782,848 B2 | 7/2014 | Ziegler et al. | |
| 8,855,813 B2 | 10/2014 | Ziegler et al. | |
| 8,931,971 B2 | 1/2015 | Schwarz et al. | |
| 8,961,695 B2 | 2/2015 | Romanov et al. | |
| 8,966,707 B2 | 3/2015 | Ziegler et al. | |
| 2002/0016649 A1 | 2/2002 | Jones | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0155631 A1 | 7/2005 | Kilkenny et al. | |
| 2005/0204717 A1 | 9/2005 | Colens | |
| 2005/0229344 A1 | 10/2005 | Mittelstaedt | |
| 2005/0251292 A1 | 11/2005 | Casey et al. | |
| 2006/0190133 A1 * | 8/2006 | Konandreas | A22C 17/0013 700/245 |
| 2006/0200281 A1 | 9/2006 | Ziegler et al. | |
| 2007/0213892 A1 | 9/2007 | Jones et al. | |
| 2007/0266508 A1 | 11/2007 | Jones et al. | |
| 2008/0127446 A1 | 6/2008 | Ziegler et al. | |
| 2008/0140255 A1 | 6/2008 | Ziegler et al. | |
| 2008/0155768 A1 | 7/2008 | Ziegler et al. | |
| 2008/0276407 A1 | 11/2008 | Schnittman et al. | |
| 2008/0307590 A1 | 12/2008 | Jones et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2012/0326824 A1 | 12/2012 | Harris | |
| 2013/0211589 A1 | 8/2013 | Landry et al. | |
| 2014/0129028 A1 | 5/2014 | Landry et al. | |
| 2014/0259511 A1 | 9/2014 | Ziegler et al. | |
| 2014/0289992 A1 | 10/2014 | Ziegler et al. | |
| 2015/0128364 A1 * | 5/2015 | Dooley | A47L 13/16 15/98 |
| 2015/0166060 A1 * | 6/2015 | Smith | B60W 30/09 701/23 |
| 2016/0296092 A1 | 10/2016 | Wolfe et al. | |

OTHER PUBLICATIONS

International Search Report and Written Opinion in International Application No. PCT/US2015/061286, dated Mar. 11, 2016, 20 pages.
European Search Report issued in European Application No. 15195627.3 dated Jul. 27, 2016, 5 pages.
International Preliminary Report on Patentability on International Application No. PCT/US2015/061286, dated Oct. 19, 2017, 13 pages.

* cited by examiner

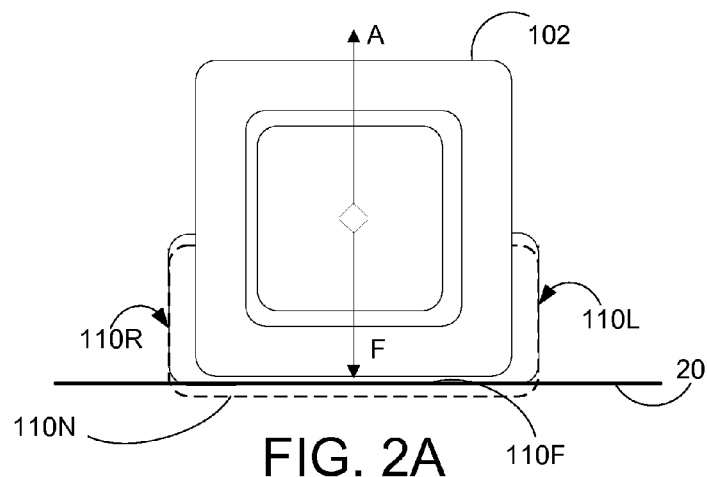
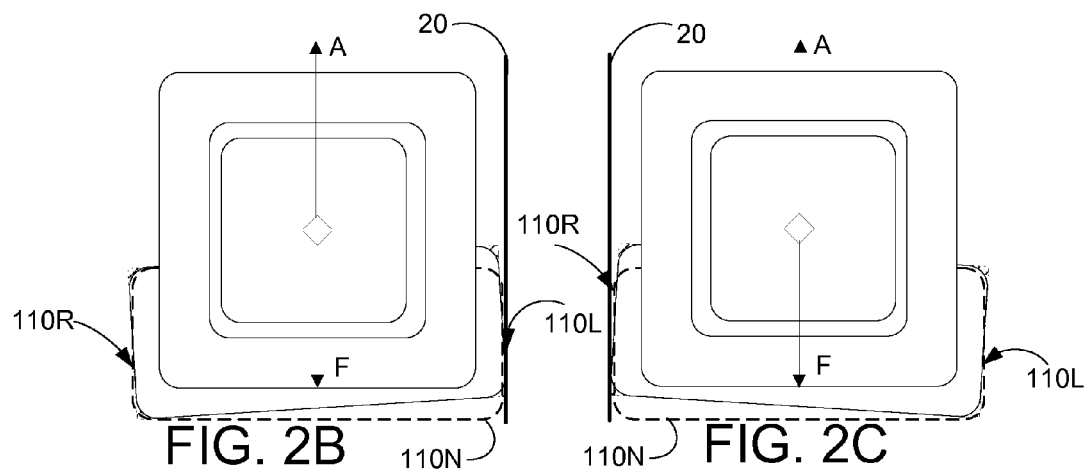

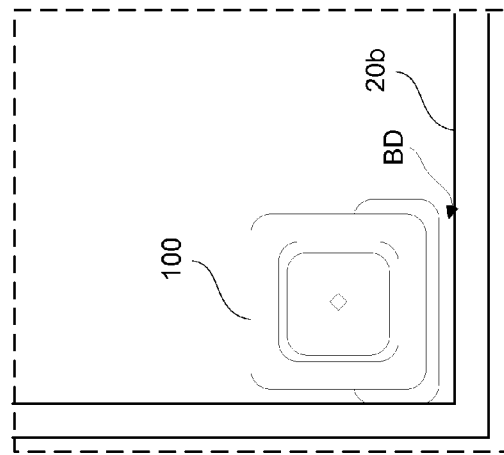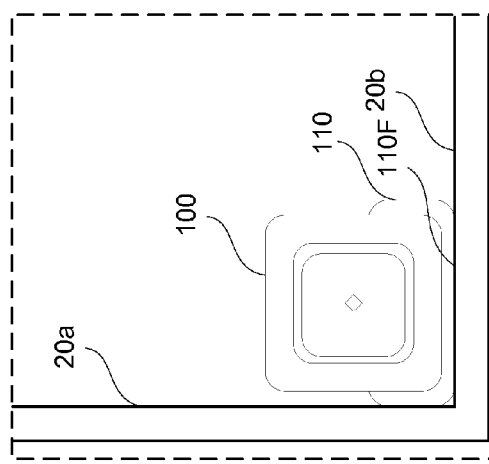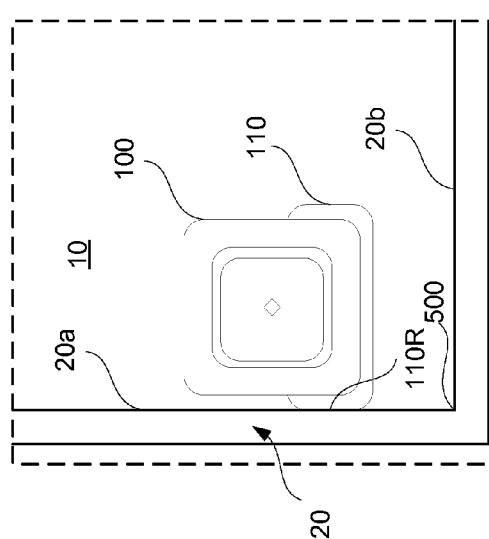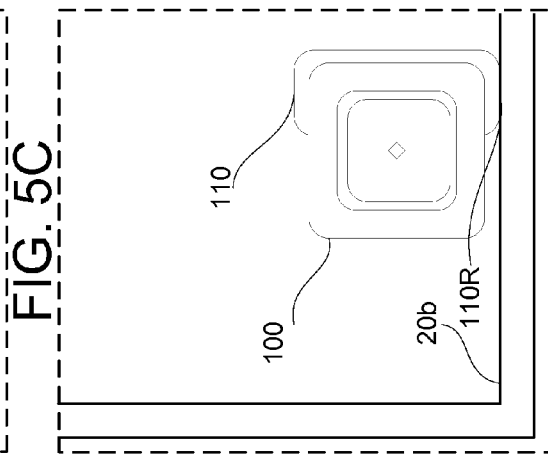

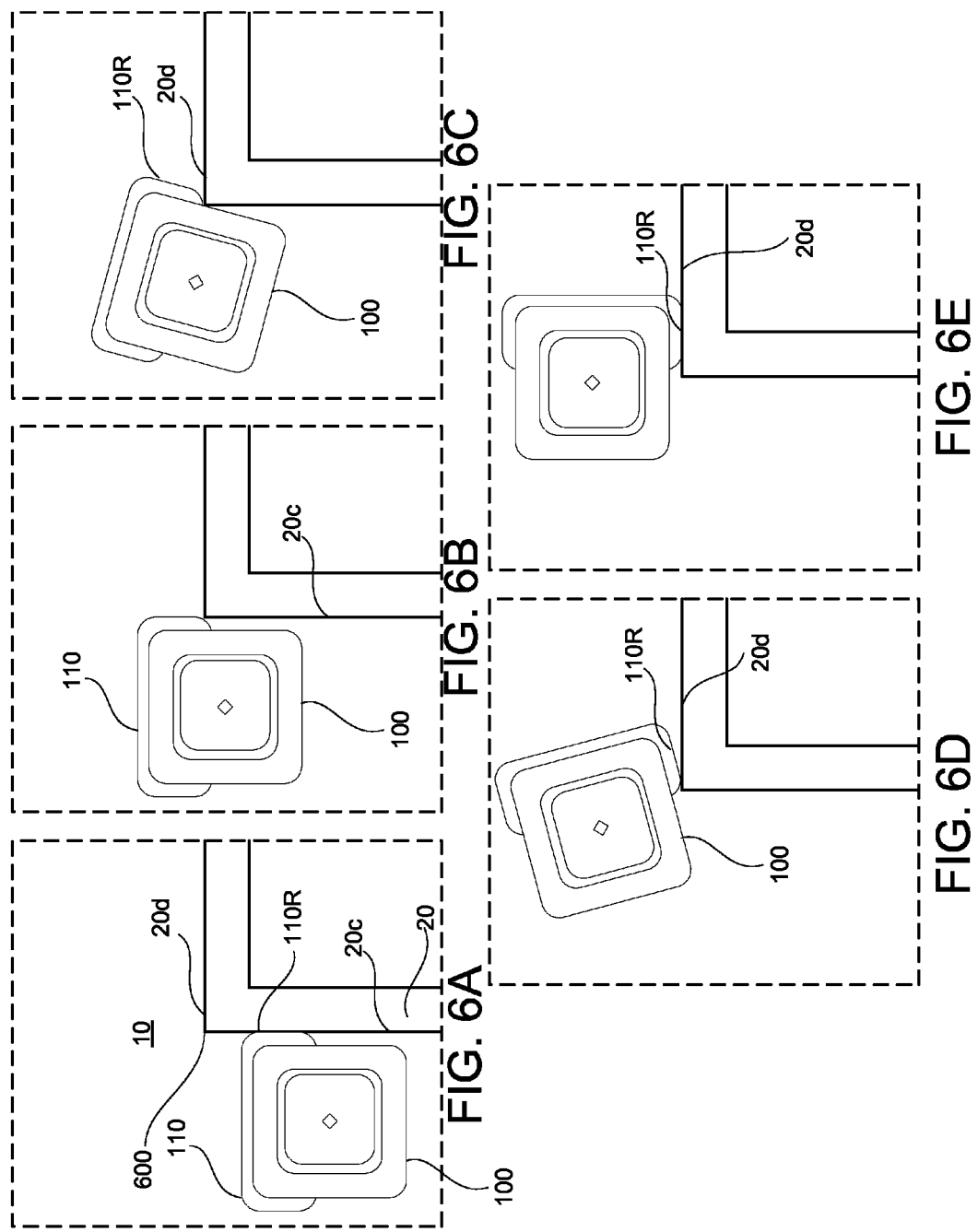

WALL FOLLOWING ROBOT

CROSS-REFERENCE TO RELATED APPLICATION

This application is a continuation application of, and claims priority to, U.S. application Ser. No. 14/682,760, filed on Apr. 9, 2015, the entire contents of which are hereby incorporated by reference.

TECHNICAL FIELD

This disclosure relates generally to controlling movement of a robot to track an obstacle, such as a wall, during movement.

BACKGROUND

Mobile robots may be used to traverse surfaces to perform various operations, such as cleaning, vacuuming, or the like. Obstacles, such as walls, fixtures, or the like, may make it difficult for some mobile robots to reach some areas. For example, a surface adjacent to the intersection between a wall and a floor may be difficult for a robot to traverse.

SUMMARY

An example robot can maintain contact with a wall surface as the robot executes a wall following behavior. A sensor associated with a bumper of the robot enables continuous contact between the robot's cleaning pad and the wall surface while the robot tracks the wall surface. The sensor can also detect when the bumper has lost contact with the wall surface so that the robot can adjust its own orientation to continue following the wall surface.

An example robot includes a body that is movable relative to a surface, a bumper mounted on the body to enable movement of the bumper relative to the body, a sensor to produce a signal in response to the movement of the bumper relative to the body caused by contact between the bumper and the surface, and a controller to control movement of the body to cause the body to track the surface based on a value. The bumper is movable between an uncompressed position relative to the body and a compressed position relative to the body. The signal varies linearly with the movement of the bumper relative to the body. The value is based on the signal and indicates that the bumper in a partially compressed position has a compression range between the uncompressed position and the compressed position. The example robot may include one or more of the following features, either alone or in combination.

The surface can include a wall surface. Configurations of the controller to control movement of the body can include configurations to cause the robot to maintain contact with the wall surface at an angle of between about 3 degrees and about 20 degrees. The robot can include a cleaning pad attached to a bottom of the body and a fluid applicator configured to dispense fluid from the robot. The cleaning pad can extend beyond the bumper.

Configurations of the controller to control movement of the body to cause the body to track the surface can include configurations to cause the robot to execute a wall following behavior in which the controller controls movement of the body to cause the body to contact the wall surface at an angle such that the bumper is in the partially compressed position, and in which the controller adjusts rotational and translational speeds of the robot to maintain compression of the bumper in the partially compressed position. Configurations of the controller to control movement of the body to cause the body to track the surface can include configurations to cause the robot to maintain contact between the cleaning pad and the wall surface in a wall following behavior.

The sensor may be a first sensor and the signal may be a first signal. The robot may include a second sensor to produce a second signal in response to movement of the bumper. The second signal can vary linearly with the movement of the bumper. The controller can be programmed to calculate the value based on a first value that is based on the first signal and a second value that is based on the second signal.

The body can have a left side, a right side, a front, and a back. The first sensor can be adjacent to the right side and the second sensor can be adjacent to the left side. The bumper can be located along the front of the robot and can extend partially along the left side and the right side. The robot can include a third sensor to produce a third signal in response to movement of the bumper. The third signal can vary linearly with the movement of the bumper. The third sensor can be between the left side and the right side, and the third sensor can be adjacent to the front.

The sensor can be or include a post mounted to the bumper, a magnet mounted to the post, and a Hall Effect sensor mounted in the body above the magnet. The sensor can be or include a capacitive sensor. The capacitive sensor can include a pair of capacitive plates. At least one of the capacitive plates can be moveable relative to another of the capacitive plates based on movement of the bumper. The controller can be programmed to determine a time constant from signals produced in response to movement of the at least one capacitive plate. The sensor can be or include an inductive sensor. The inductive sensor can include a core material that is movable within windings based on movement of the bumper. The controller can be programmed to determine a time constant from signals in response to movement of the core material.

The surface can include a wall of a room, and the controller can be programmed to control movement of the body to track the wall surface to maintain contact with the wall by maintaining the value within the compression range. The controller can be programmed to dynamically calibrate a position of the bumper relative to the body in response to the bumper being within a predefined range of the uncompressed position. The controller can be programmed to control movement of the body to cause the body to retreat from the surface in response to the value being outside the compression range and indicative of the bumper being compressed further than an amount of compression associated with the compression range. The controller can be programmed to control movement of the body to cause the body to turn toward the surface in response to the value being outside the compression range and indicative of the bumper being compressed less than an amount of compression associated with the compression range.

The body can include wheels, and the robot can include detectors associated with the wheels. The detectors can be for detecting speed of the wheels. The controller can be programmed to control movement of the body to cause the body to retreat from the surface, to turn-away from the surface, and then to re-engage the surface based, at least in part, on the speed of the wheels being less than a predetermined speed and the value being outside the compression range. The controller can be programmed to cause the body to track the surface at an angle. The controller may be programmed to adjust the angle based on the value.

Another example robot can include a body that is movable relative to a surface, a bumper mounted on the body to enable movement of the bumper relative to the body, linear sensors to produce signals in response to movement of the bumper relative to the body caused by contact between the bumper and the surface over a period of time, and a controller to generate one or more control signals based on the signals produced by the linear sensors. The signals vary linearly with movement of the bumper. The one or more control signals can be for controlling movement of the body to track the surface at least during the period of time. The example robot may include one or more of the following features, either alone or in combination.

The surface can include a wall surface. Configurations of the controller to control movement of the body can include configurations to cause the robot to maintain contact with the wall surface at an angle of between about 3 degrees and about 20 degrees. The robot can include a cleaning pad attached to a bottom of the body and a fluid applicator configured to dispense fluid from the robot. The cleaning pad can extend beyond the bumper.

Configurations of the controller to control movement of the body to cause the body to track the surface can include configurations to cause the robot to execute a wall following behavior in which the controller controls movement of the body to cause the body to contact the wall surface at an angle such that the bumper is in the partially compressed position, and in which the controller adjusts rotational and translational speeds of the robot to maintain compression of the bumper in the partially compressed position. Configurations of the controller to control movement of the body to cause the body to track the surface can include configurations to cause the robot to maintain contact between the cleaning pad and the wall surface in a wall following behavior.

The linear sensors can include a first linear sensor and a second linear sensor. The first linear sensor can be disposed adjacent to a first side of the body, and the second linear sensor can be disposed adjacent to second side of the body. The linear sensors can include a third linear sensor disposed between the first linear sensor and the second linear sensor.

Each linear sensor can include a post mounted to the bumper, a magnet mounted to the post, and a Hall Effect sensor mounted in the body above the magnet. Each linear sensor can be or include a capacitive sensor. The capacitive sensor can include a pair of capacitive plates. At least one of the capacitive plates can be moveable relative to another of the capacitive plates based on movement of the bumper. The controller can be programmed to determine a time constant from signals produced in response to movement of the at least one capacitive plate. Each linear sensor can be or include an inductive sensor. The inductive sensor can include a core material that is movable within windings based on movement of the bumper. The controller can be programmed to determine a time constant from signals in response to movement of the core material.

An example method of controlling a robot includes determining, based on at least one signal that varies linearly with an amount of force between the robot and a surface, that there is a level of contact between the robot and the surface that exceeds a threshold, and controlling the robot to track the surface to maintain at least the level of contact between the robot and the surface that exceeds the threshold. The example method may include one or more of the following features, either alone or in combination.

The threshold can be a lower threshold. The method can include determining, based on the at least one signal, that the amount of force between the robot and the surface exceeds an upper threshold, with the upper threshold being greater than the lower threshold, and in response to determining that the amount of force between the robot and the surface exceeds the upper threshold, controlling the robot to retreat from the surface.

The robot can include wheels. The method can include detecting a speed of the wheels, and based at least in part on the speed of the wheels, controlling the robot to retreat from the surface, to turn-away from the surface, and then to re-engage the surface.

The determining can be based on two or more signals that vary linearly with an amount of force between the robot and the surface. The method can include controlling an angle at which the robot engages the surface based at least in part on the two or more signals.

Advantages of the example robots and methods described herein may include, but are not limited to, the following. In an example, a robot can clean crevices, corners, and other regions that may be difficult to reach and may accumulate debris. In an example, a robot can clean rooms having geometries formed by walls and obstacles of the room. In an example, a robot has a geometry that can cause the robot to miss cleaning regions of the room. In such an example, the robot can implement wall following in order to access regions that other movement and cleaning patterns may miss during the cleaning operation.

Any two or more of the features described in this specification, including in this summary section, can be combined to form implementations not specifically described herein.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

The details of one or more implementations are set forth in the accompanying drawings and the description herein. Other features and advantages will be apparent from the description and drawings, and from the claims.

DESCRIPTION OF DRAWINGS

FIGS. 5A to 5F illustrates a mobile robot cleaning an inside corner.

FIGS. 6A to 6E illustrates a mobile robot cleaning an outside corner of a perimeter.

Like reference numerals in different figures indicate like elements.

DETAILED DESCRIPTION

Described herein are example robots configured to traverse surfaces, such as floors, carpets, turf, or other materials. The example robots may be configured to perform various operations vis-à-vis the surfaces including, but not limited to, vacuuming, wet or dry cleaning, damp cleaning, polishing, and the like.

Open areas of the surfaces may be traversed in a pattern or randomly. Walls or other obstacles (e.g., having vertical surfaces) may affect how the robot traverses the surface. For example, surfaces adjacent to walls can be difficult to reach using patterned or random traversal. Accordingly, the example robots described herein employ wall following (also referred to as tracking) techniques that may enable the robots to traverse surfaces adjacent to walls or other obstacles. One example tracking technique described herein includes using a linear sensor to sense force between the robot and a wall and, in response to the sensed force, controlling movement of the robot to follow the wall. In some implementations, the movement of the robot is controlled based on measuring the amount of force between the robot and the wall such that the measured forced remains within a target range. For example, the robot can contact the wall at an angle (e.g., between 5 and 10 degrees) such that the bumper is partially compressed due to friction between the wall and the bumper. Other implementations are also described.

Figure 1A:
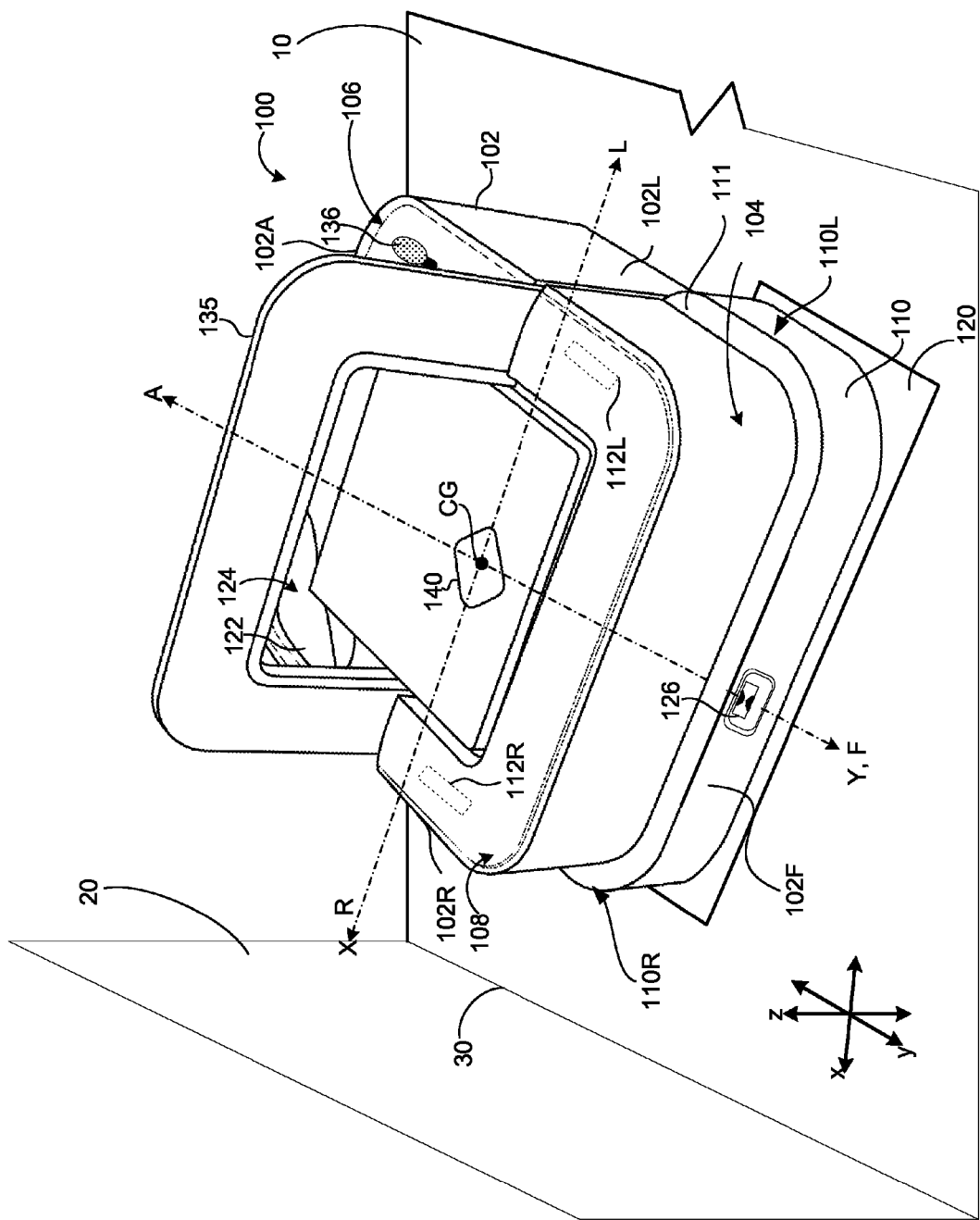
FIG. 1A is a perspective view of a mobile robot.

The example tracking techniques described herein may be used with any appropriate type of robot or other apparatus that encounters walls or other obstacles in its travels. An example of a robot that employs such tracking techniques is a mobile robot that can clean a floor surface of a room by navigating about the room. Referring to FIG. 1A, in some implementations, a mobile robot 100 navigates and cleans a floor surface 10 of a room having a lateral wall surface 20. In some implementations, the robot weighs less than 5 lbs (e.g., less than 2.26 kg) and has a center of gravity CG. In some implementations, the mobile robot may be autonomous. The robot 100 includes a body 102 supported by wheels (not visible in FIG. 1A) that can maneuver the robot 100 across the floor surface 10 based on, for example, a drive command having x, y, and θ components. As shown, the robot body 102 has a square shape and defines an X-axis and a Y-axis. The X-axis defines a rightward direction R of the robot 100 and a leftward direction L of the robot 100. The Y-axis defines a rearward direction A (aftward) of the robot 100 and a forward direction F of the robot 100. In other implementations, the body 102 can have other shapes, such as a circular shape, an oval shape, a tear drop shape, a rectangular shape, a combination of a square or rectangular front and a circular back, or a longitudinally asymmetrical combination of any of these shapes. The body 102 includes a bottom portion (not shown) and a top portion 108.

Along the bottom portion of the robot body 102, one or more rear cliff sensors (not shown) located in one or both of the two rear corners of the robot 100 and one or more forward cliff sensors (not shown) located in one or both of the front corners of the mobile robot 100 detect ledges or other steep elevation changes of the floor surface 10 and prevent the robot 100 from falling over such floor edges. The cliff sensors may be mechanical drop sensors or light-based proximity sensors, such as an IR (infrared) pair, a dual emitter, single receiver or dual receiver, single emitter IR light based proximity sensor aimed downward at a floor surface 10.

The body 102 carries a movable bumper 110 for detecting collisions in longitudinal (A, F) or lateral (L, R) directions. The bumper 110 is mounted to a front side 102F of the robot body 102 and wraps around to the right side 102R and a left side 102L of the robot body 102. The bumper 110 has a shape complementing the robot body 102 and extends forward of the robot body 102. The bumper 110 includes a lower portion 111 extending such that the overall dimension of the front side 102F is wider than a back side 102A of the robot body 102. The robot body 102 supports the bumper 110 such that the bumper 110 can translate and rotate relative to the robot body 102. As a result, a right portion 110R and a left portion 110L of the bumper 110 can move in different directions. As will be described in more detail herein, a left bumper sensor assembly 112L and a right bumper sensor assembly 112R are positioned within the robot 100 such that the left bumper sensor assembly 112L can detect movement of the left portion 110L of the bumper 110 and the right bumper sensor assembly 112R can detect movement of the right portion 110R of the bumper 110. The right bumper sensor assembly 112R is located adjacent to the right side 102R of the robot body 102. The left bumper sensor assembly 112L is located adjacent to the left side 102L of the robot body 102. In general, the bumper sensor assemblies 112L, 112R can be linear sensor assemblies that provide an analog signal that is linear with respect to a force on the bumper 110. In some implementations, as described herein, additional sensor assemblies may be included in the robot, e.g., between the left and right sensor assemblies.

In some examples, using a linear sensor that provides an analog sensor can provide various advantages. For example, the linear sensor provides a signal that varies with the extent of the bumper compression. If the bumper is compressed half-way between an uncompressed position and a fully compressed position, the value of the voltage or current from the sensor will be half of the value when the bumper is fully compressed.

Figure 1B:
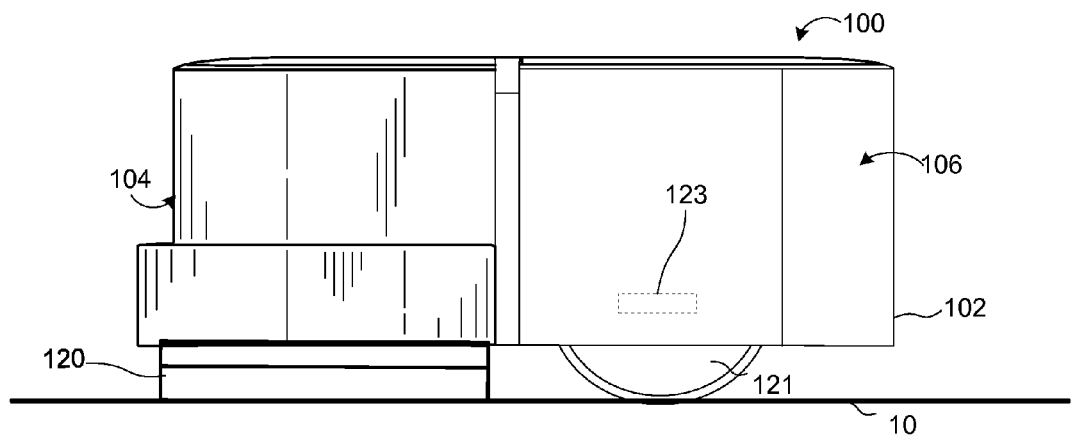
FIG. 1B is a side view of the mobile robot of FIG. 1A.

Referring to FIG. 1B, the bottom portion of the robot body 102 includes an attached cleaning pad 120. The bottom portion of the robot body 102 includes wheels 121 that rotatably support a rearward portion 106 of the robot body 102 as the robot 100 navigates about the floor surface 10. Each of the wheels 121 may be operable with a current sensor 123 that determines the current delivered to each of the wheels 121. Each of the wheels 121 may also be associated with, and operable with, an encoder that determines a position of each of the wheels 121. The encoder can be an optical encoder that detects the rotational position of the wheel 121. Based on the rotational position, a controller of the robot 100 can determine accelerations and/or speeds of the wheels 121. The cleaning pad 120 supports a forward portion 104 of the robot body 102 as the robot 100 navigates about the floor surface 10. The current sensor 123 and the encoder together can sense when the wheels 121 of the robot 100 are being driven without movement of the robot in the forward drive direction F.

A reservoir 122 within the robot body 102 holds a cleaning fluid 124 (e.g., cleaning solution, water, and/or detergent). In some examples, the reservoir 122 has a capacity of 170 to 230 mL or about 200 mL. The robot 100 includes a fluid applicator 126 connected to the reservoir 122 by a tube within the robot body 102. In some examples, the fluid applicator 126 can be a sprayer or spraying mechanism.

The top portion 108 of the robot 100 may include a handle 135 for a user to carry the robot 100. When folded, the handle 135 nests in a recess in the top portion 108 of the robot 100. The top portion 108 may also include a toggle button 136 disposed beneath the handle 135 that activates a pad release mechanism. The user can also press a clean button 140 to turn on the robot 100 and to instruct the robot 100 to begin a cleaning operation. The clean button 140 can be used for other robot operations as well, such as turning off the robot 100 and/or establishing a virtual barrier location.

Figure 1C:
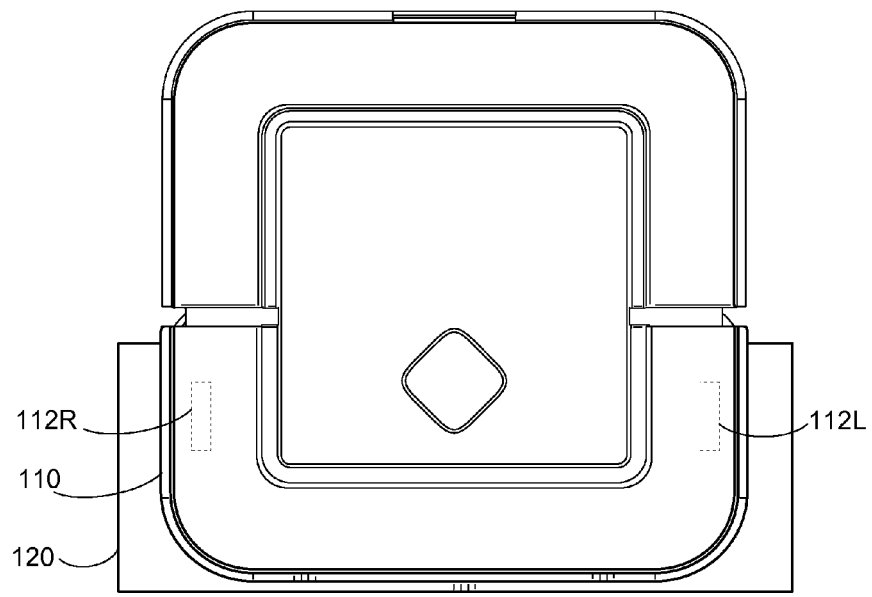
FIG. 1C is a top view of the mobile robot of FIG. 1A.

Referring to FIG. 1C, in some cases, the cleaning pad 120 can extend beyond the width of the bumper 110 such that the robot 100 can position an outer edge of the pad 120 up to and along tough-to-reach surfaces or into crevices, such as at a wall-floor interface 30. In some examples, the cleaning pad 120 extends beyond the body 102 of the robot 100 by approximately 0.1 to 10 mm (e.g., 0.5 mm to 2 mm, 1 mm to 3 mm, 1 mm to 5 mm, 2 mm to 5 mm, 3 mm to 6 mm, 5 mm to 10 mm, about 1 mm, about 5 mm, about 10 mm). In such implementations, the ends of the cleaning pad 120 contact the wall surface 20 and, as described herein, can cause the bumper 110 to move due to friction forces on the cleaning pad 120. In an implementation, the cleaning pad 120 extends up to the edges and does not extend significantly beyond a pad holder (not shown) of the robot. The bumper 110, in this case, contacts the wall surface 20 and moves due to friction between the bumper and the wall surface 20.

The robot 100 can push the edge of the pad 120 against wall surfaces or other vertically extending surfaces. The position of the cleaning pad 120 further allows the cleaning pad 120 to clean the surfaces or crevices of a wall or other vertically extending surface by the extended edge of the cleaning pad 120 while the robot 100 moves in a wall following motion for a period of time. The extension of the cleaning pad 120 can thus enable the robot 100 to clean in cracks and crevices beyond the reach of the robot body 102. As described herein, as the robot 100 initiates a wall following pattern or behavior along a lateral surface of the room (e.g., the wall surface 20), the cleaning pad 120 can be pressed against the wall surface 20 so that debris located along the wall-floor interface 30 can be picked up by the cleaning pad 120.

Figure 1D:
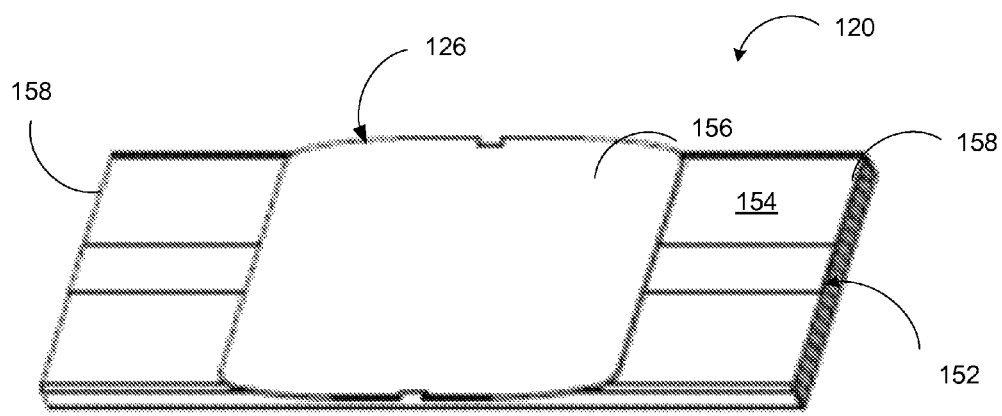
FIG. 1D is a top view of a cleaning pad for use with the mobile robot of FIG. 1A.

Referring to FIG. 1D, in an example, the cleaning pad 120 includes absorptive layers 152, an outer wrap layer 154, and a card backing 156. The pad 120 has bluntly cut ends 158 such that the absorptive layers 152 are exposed at both ends of the pad 120 and the full length of the pad 120 is available for fluid absorption and cleaning. The absorbed cleaning fluid may be securely held by the absorptive layers 152 so that the cleaning fluid does not drip from the cleaning pad 120. In some cases, the cleaning pad 120 is disposable. In other cases, the cleaning pad 120 is a reusable (e.g., machine washable) microfiber cloth pad with a durable plastic backing.

Figure 1E:
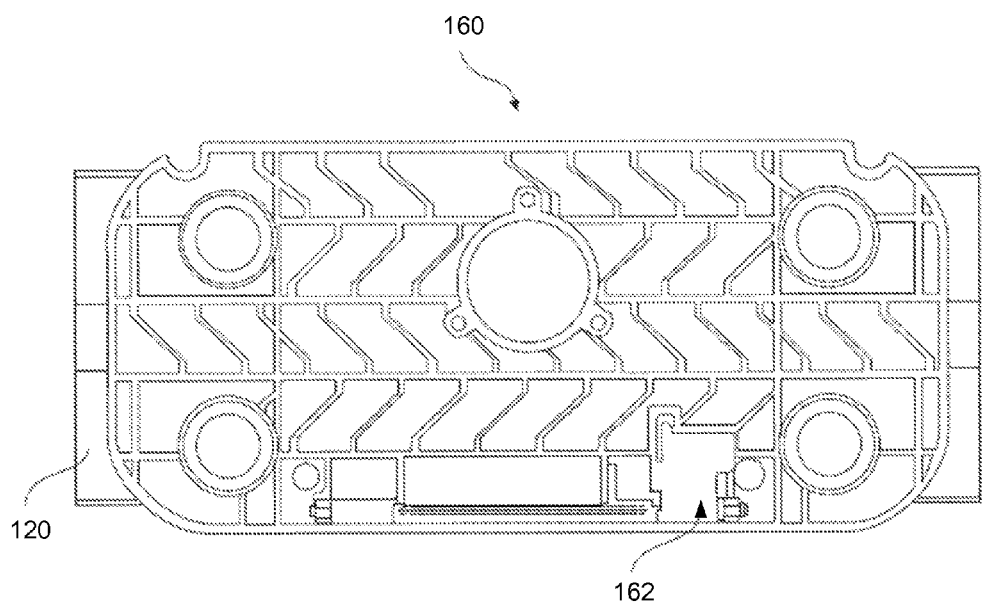
FIG. 1E is a top view of a cleaning pad attachment mechanism.

Also referring to FIG. 1E, the cleaning pad 120 may be secured to the bottom portion of the robot 100 by a pad holder 160. The pad holder 160 may hold the cleaning pad 120 securely in place by grasping the card backing 156. The cleaning pad 120 can be installed into the pad holder 160 from either of two identical directions (180 degrees opposite to one another). The pad holder 160 can release the cleaning pad 120 when a pad release mechanism 162 is triggered using a toggle button 136 (shown in FIG. 1A).

Figure 1F:
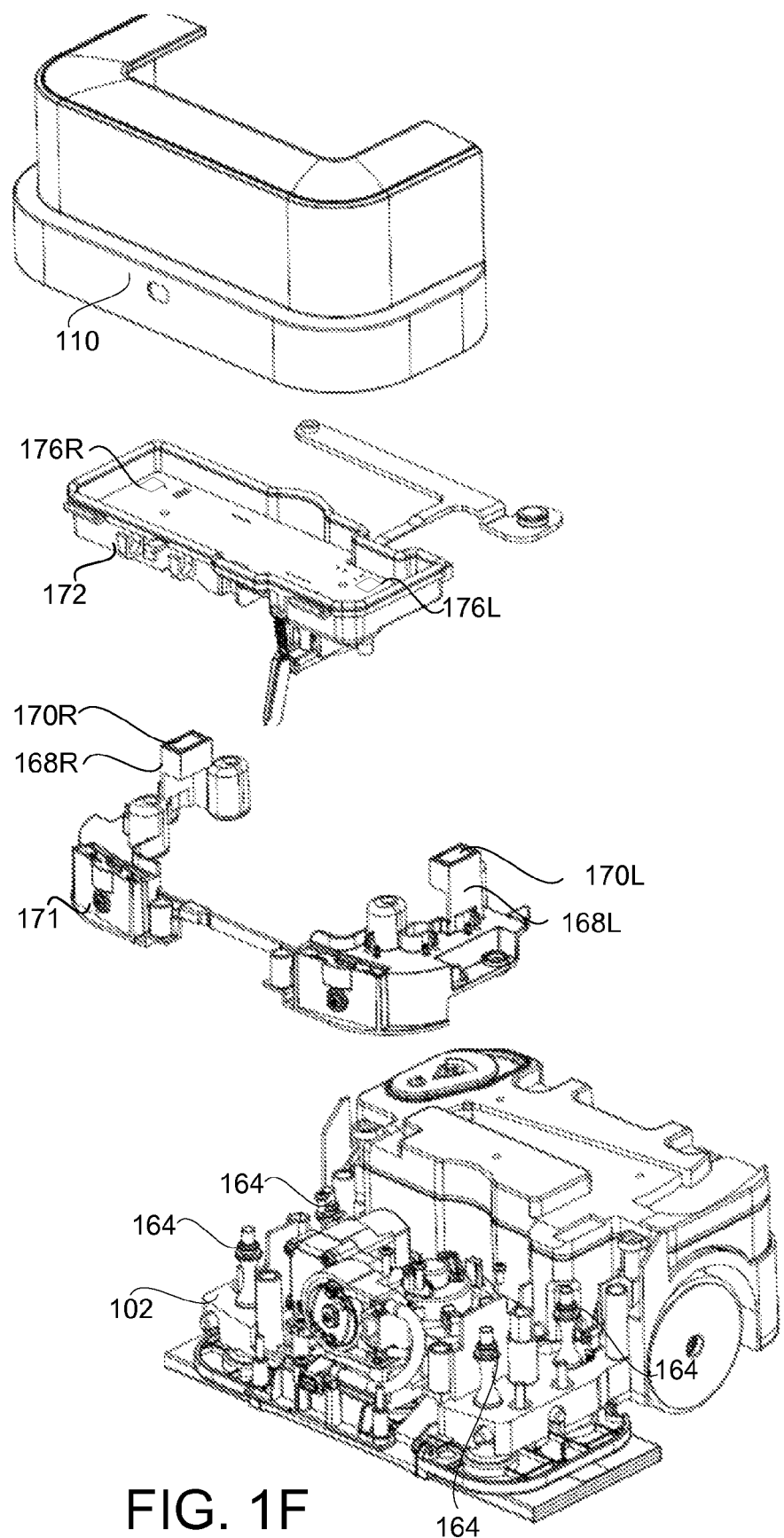
FIG. 1F is an exploded perspective view of the mobile robot of FIG. 1A.
Figure 1G:
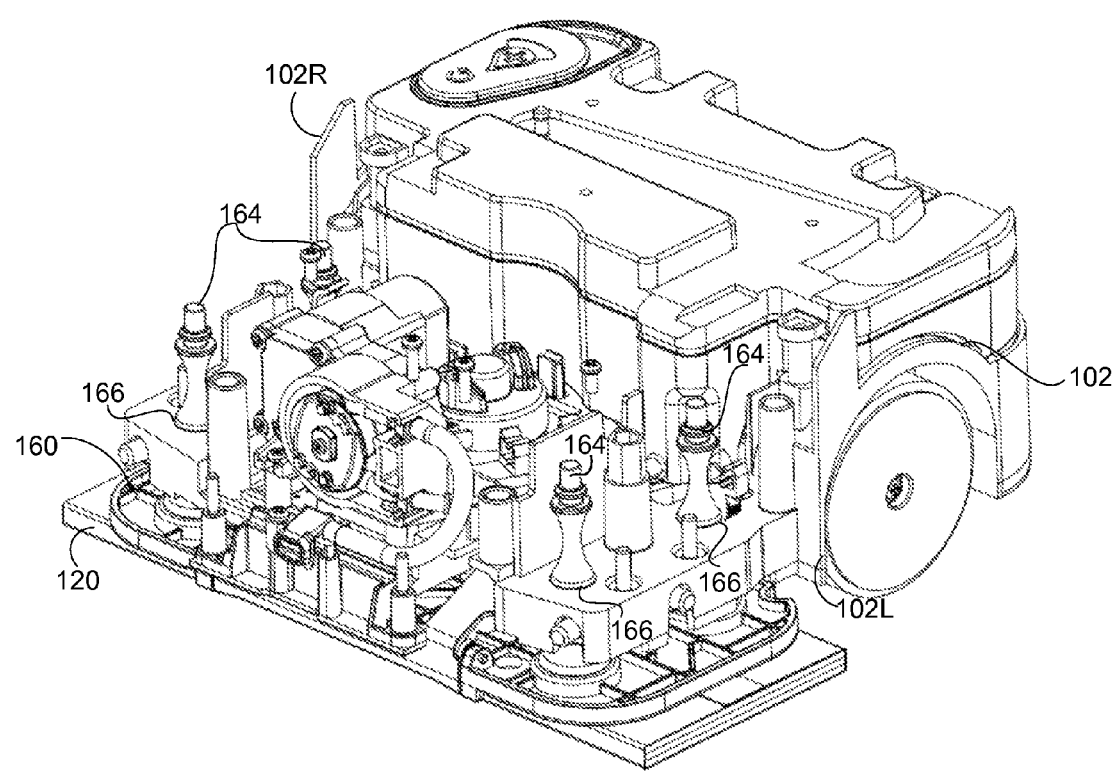
FIG. 1G is a perspective view of a top portion removed from the mobile robot of FIG. 1A
Figure 1H:
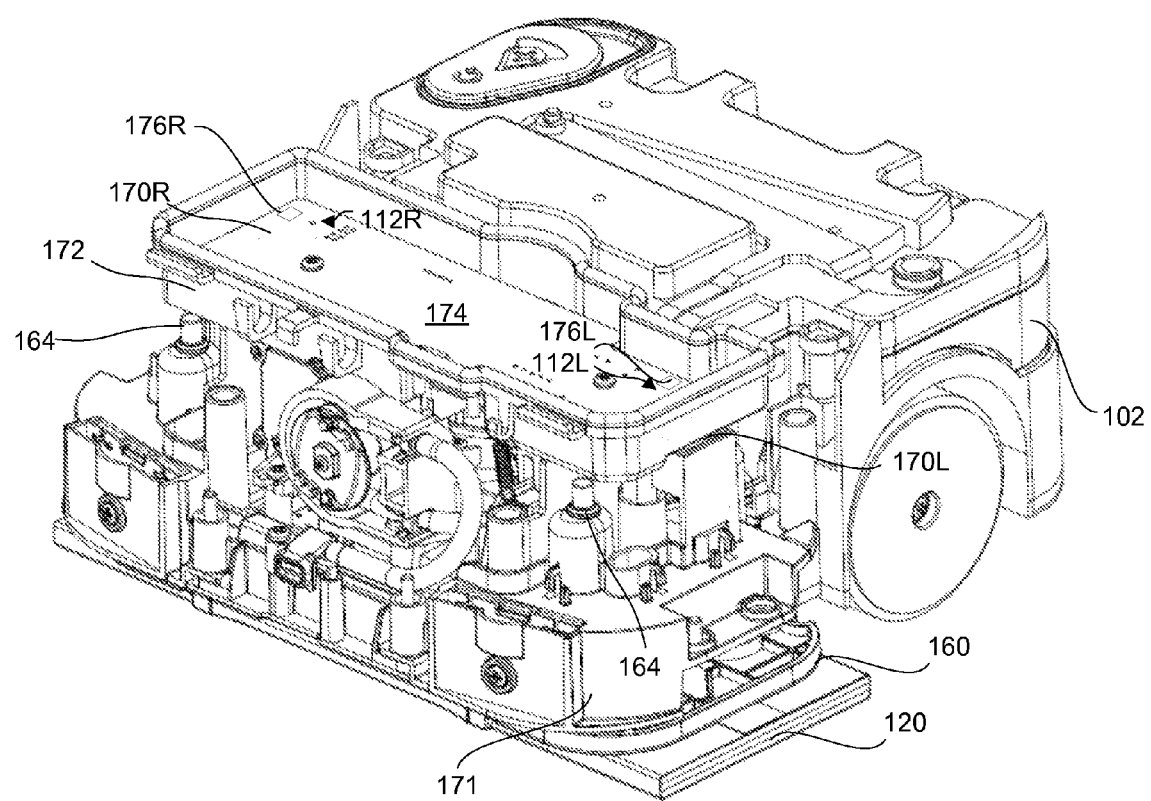
FIG. 1H is a perspective view of a top portion removed from the mobile robot of FIG. 1A
FIG. 2A to 2C are top schematic views of a bumper of a mobile robot contacting a wall surface.

Referring to FIGS. 1F to 1H, posts 164 traverse the robot body 102 to attach a bumper chassis 171 of the bumper 110 to the robot body 102. The bumper chassis 171 is fixed to the bumper 110 (e.g., using fasteners). Referring to FIG. 1G, the posts 164 insert into apertures 166 defined by the robot body 102. The posts 164 may have a cross sectional diameter varying in size along their length and is further sized to fit in the apertures 166 defined by the robot body 102. The posts 164 can be made of a flexible material (e.g., an elastomer or other resilient material). The material of the posts 164 allows the bumper 110, and hence the bumper chassis 171, to move relative to the robot body 102 upon contact between the bumper 110 and an obstacle or vertically oriented or extending surface in the environment.

Referring to FIG. 1H, the robot 100 includes the left sensor assembly 112L and the right sensor assembly 112R to detect motion of the bumper 110 relative to the robot body 102. In some implementations, additional sensor assembly (ies) may be included, such as a center sensor assembly (described herein). In some implementations, the left and right sensor assemblies 112L, 112R include linear sensors. In some implementations, a linear sensor has a response to an applied force that is linear over at least a limited range. In some implementations, the response may be linear over an entire range of the applied force, whereas in other implementations, the response may be linear over only a limited range of applied force. In other implementations, a non-linear sensor may be used and the signals from the non-linear sensor can be remapped by, for example, a controller of the robot to compute an estimate of the applied force with respect to the magnitude of the signal. Example linear sensors include Hall Effect sensors, capacitive sensors, or inductive sensors. Any appropriate type of linear sensor may be used. The following example addresses use of a Hall Effect sensor, which can be a transducer that varies its output voltage in response to a magnetic field. The Hall Effect sensor can operate as an analog transducer, directly returning an analog voltage signal in response to the magnetic field. With a known magnetic field, its distance from the Hall plate can be determined and the relative position of the magnet can be deduced based on the measured voltage.

Referring to FIG. 1F, the bumper chassis 171 includes a left pedestal or post 168L which a left magnet 170L is mounted and housed. The left magnet 170L forms part of the left bumper sensor assembly 112L described above. The bumper chassis 171 also includes a right post 168R and a right magnet 170R for the right bumper sensor assembly 112R. The magnet 170L may be coupled to the post 168L of the bumper chassis 171, which allows the magnet 170L to move relative to the robot body 102 of the robot 100.

Referring back to FIG. 1H, in this example, a platform 172 is fixed to the robot body 102. When the bumper 110 moves relative to the robot body 102, the bumper chassis 171, which is fixed to the bumper 110, also moves relative to the platform 172. The bumper chassis 171 can also be attached to the resilient posts 164 to dampen the dynamic response of the bumper 110 (e.g., in response to a force from contact with obstacles in the environment), dissipate kinetic energy of the bumper, and absorb mechanical shock.

In some implementations, the platform 172 includes a circuit board 174 that includes a left Hall Effect sensor 176L and a right Hall Effect sensor 176R. In some implementations, the bumper sensor assemblies 112L and 112R include a first component attached to the robot body 102 (e.g., sensors 176L, 176R) and a second component attached to the bumper 110 via the bumper chassis 171 (e.g., magnets 170L, 170R). Referring back to FIG. 1C, the left bumper sensor assembly 112L includes the left sensor 176L coupled to the robot body 102 and the left magnet 170L coupled to the left portion 110L of the bumper 110 via the bumper chassis 171. The right bumper sensor assembly 112R includes the right sensor 176R coupled to the robot body 102 and the right magnet 170R coupled to the right portion 110R of the bumper 110 via the bumper chassis 171. The left sensor 176L is positioned on or near the left side 102L of the robot body 102 (shown in FIG. 1A) and above the left magnet 170L. The right sensor 176R is positioned on or near the right side 102R of the robot body 102 and above the right magnet 170R. The Hall Effect sensors 176L and 176R generate a voltage in response to nearby magnetic fields, such as, for example, the magnetic fields generated by the magnets 170L and 170R.

The configuration of the left and right bumper sensor assemblies 112L and 112R allow the left and right sensors 176L and 176R to detect movement of the magnets 170L and 170R relative to the sensors 176L and 176R. The magnets 170R, 170L generate magnetic fields that vary in strength at the location of the sensors 176R, 176L as the magnets 170R, 170L move farther from or closer to the sensors 176R, 176L. The left and right sensors 176L and 176R, in turn, generate voltages in response to movements of the left and right magnet 170L and 170R, respectively, relative to the left and right sensors 176L and 176R, respectively. The voltages vary linearly with changes in the magnetic field. Thus, the sensors 176L and 176R provide an analog response signal that varies based on the extent to which the bumper 110 is depressed. As the magnets 170L and 170R move farther from their respective sensors 176L and 176R, the strengths of the magnetic fields at the locations of the sensors 176L and 176R weaken, and thus the sensors 176L and 176R generate a smaller voltage. In contrast, as the magnets 170L and 170R move closer to their respective sensors 176L and 176R, the strengths of the magnetic fields at the locations of the sensors 176L and 176R increase, and thus the sensors 176L and 176R generate a larger voltage. Since the sensors 176L and 176R are coupled to the robot body 102 and the magnets 170L and 170R are coupled to the bumper 110, the analog voltages generated by the sensors 176L and 176R correspond to movement of the bumper 110 relative to the robot body 102 due to, for instance, contact of the bumper 110 with obstacles in the room, such as a wall. For example, friction force between the wall and the bumper 110 cause the bumper 110 to move between uncompressed and partially compressed positions, causing the Hall Effect sensors to register voltages that vary linearly with the amount of compression experienced by the bumper due to friction between the wall and the bumper. More specifically, signals from the sensors 176L, 176R (e.g., the voltages of the sensors 176L, 176R) vary linearly with the movement of the bumper 110 relative to the robot body 102.

While the sensors 176L and 176R have been described as Hall Effect sensors, in some implementations, the sensors can be capacitive sensors such that the bumper sensor assemblies operate based on a change in sensed capacitance by the capacitance sensors. For example, capacitive plates can replace the magnets 170L and 170R, and a corresponding pair of capacitive plates can replace the Hall Effect sensors 176L, 176R. The capacitance of the left and right plate pairs can be measured independently using a variety of techniques that, for example, dynamically measure the electric coupling by measuring an RC (resistive-capacitive) time constant. The capacitance of left and right pairs can vary linearly depending on the distance of the capacitive sensors from the capacitive plates. In other implementations, the sensors 176L, 176R can be inductive sensors. In this case, the capacitive plates on the circuit board are replaced with spiral PCB (printed circuit board) traces that serve as inductors. The bumper chassis 171 can include core material (instead of the magnets 170L and 170R) that passes through the spiral traces. As the bumper 110 compresses, an amount of the core material that traverses the spiral traces can vary, thus causing a change in inductance. The inductance of those traces can be measured by measuring the inductive coupling by, for example, dynamically measuring the LR (inductive-resistive) or LRC (inductive-resistive-capacitive) time constant with an oscillator circuit.

While the left and right sensor assemblies 112L and 112R have been described above, in some implementations, the robot may additionally and/or alternatively include a front sensor assembly located between the left side of the robot and the right side of the robot. The front sensor assembly can be located adjacent to the front side of the robot and can produce a signal in response to movement of the bumper in, for example, the right direction R and the left direction L. The front sensor assembly would thus be able to detect forces on the bumper in the lateral direction.

While the magnets 170R, 170L have been described to be fixed to the bumper 110 and the sensors 176R, 176L have been described to be fixed to the robot body 102, in some implementations, the sensors may be fixed to the bumper and the magnets may be fixed to the robot body. In such implementations, the sensors and magnets can move relative to one another to cause the magnetic field at the sensors to vary.

As shown in FIGS. 2A, 2B, and 2C, a neutral position 110N of the bumper 110 is shown in dashed lines. The neutral position 110N corresponds to the position of the bumper 110 before forces are exerted on the bumper 110 to cause the bumper 110 to move (e.g., be depressed) relative to the robot body 102. As described in more detail herein, the neutral position 110N may vary from one cleaning operation to another cleaning operation. During a cleaning operation, the robot 100 can calibrate the neutral position 110N such that the neutral position 110N is interpreted as an uncompressed state of the bumper 110. The compression of the bumper 110 is herein also interchangeably referred to as rearward translation of the bumper 110. The solid lines in FIGS. 2A, 2B, and 2C depicting the bumper 110 correspond to the position of the bumper 110 after a force causes the bumper 110 to move relative to the robot body 102.

The bumper 110 can move depending on a direction and position of forces on the bumper 110 (e.g., a relative direction and a relative position of an obstacle in contact with the bumper 110). Referring to FIG. 2A, when the right portion 110R and the left portion 110L move in the rearward direction A, the bumper 110 is translating in the rearward direction A relative to the robot body 102. Contact between a front portion 110F of the bumper 110 with an obstacle such as the wall surface 20 as the robot 100 moves in the forward direction F can cause the translation of the bumper 110 in the rearward direction A. Referring to FIG. 2B, when the robot 100 encounters an obstacle on the left side of the robot body 102, the bumper 110 is depressed to a greater extent on the left portion 110L than the right portion 110R. The left portion 110L moves in the rearward direction A while the right portion 110R moves in the forward direction F or in the rearward direction A such that the right portion 110R is depressed less than the left portion 110L. The bumper 110 translates in the rearward direction A and rotates counter-clockwise relative to the robot body 102 such that, for example, the front of the cleaning pad is angled with respect to the robot body 102. Contact between the left portion 110L of the bumper 110 with the wall surface 20 as the robot 100 moves in the forward direction F can cause the clockwise rotation and rearward translation of the bumper 110 due to, for example, friction between the left portion 110L and the wall surface 20. Referring to FIG. 2C, when the robot 100 encounters an obstacle on the right side of the robot body 102, the bumper 110 is depressed to a greater extent on the right portion 110R than the left portion 110L. The right portion 110R moves in the rearward direction A while the left portion 110L moves in the forward direction F or the rearward direction A such that the left portion 110L is depressed less than the right portion 110R. The bumper 110 translates rearward and rotates clockwise relative to the robot body 102 such that, for example, the front of the cleaning pad is angled with respect to the robot body 102. Contact between the right portion 110R of the bumper 110 with the wall surface 20 as the robot 100 moves in the forward direction F can cause the clockwise rotation and rearward translation of the bumper 110 due to, for example, friction between the right portion 110R and the wall surface 20. Referring to FIG. 1H, the left and right bumper sensor assemblies 112L and 112R can detect the movements of the left portion 110L and the right portion 110R described above with respect to FIGS. 1A to 1C. In other words, the left and right bumper sensor assemblies 112L and 112R may be configured to detect the compression of the left and right portions 110L and 110R of the bumper 110.

Although the bumper 110 has been described to contact obstacles, such as vertical surfaces (e.g., walls), in the environment in order to move, in some implementations, the bumper 110 can also move due to contact of the cleaning pad with surfaces in the environment.

The example robots described herein can traverse a surface by following a pattern, or by traversing it randomly. Example navigational behaviors of a robot can include a wall following pattern and an area coverage pattern. For example, the wall following pattern can be straight motion pattern, and the area coverage pattern can be a vine pattern, a cornrow pattern, or any combinations of these patterns. Other patterns are also possible.

In the straight motion pattern, the robot 100 generally moves in a straight path to follow an obstacle defined by vertical edges, such as a wall. The straight motion pattern generally corresponds to wall following behavior. The continuous and repeated use of the birdfoot pattern is referred to as the vine pattern or the vining pattern. In the vine pattern, the robot 100 executes repetitions of a birdfoot pattern in which the robot 100 moves back and forth while advancing incrementally along a generally forward trajectory. Each repetition of the birdfoot pattern advances the robot 100 along a generally forward trajectory, and repeated execution of the birdfoot pattern can allow the robot 100 to traverse across the floor surface in the generally forward trajectory. In the cornrow pattern, the robot 100 moves back and forth across a room so that the robot 100 moves perpendicular to the longitudinal movement of the pattern slightly between each traversal of the room to form a series of generally parallel rows that traverse the floor surface. The robot 100 can execute navigational behaviors that uses vine and cornrow patterns as the robot 100 traverses the room, and a straight motion pattern as the robot 100 moves about a perimeter of the room or edges of objects within the room.

Figure 3A:
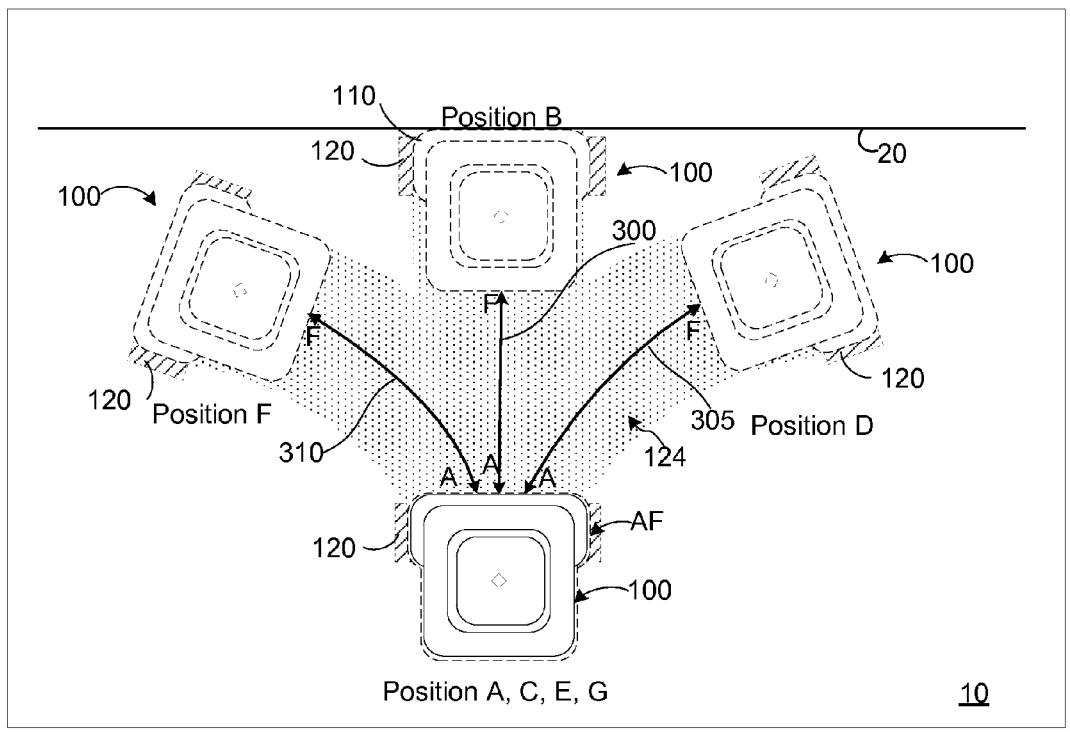
FIG. 3A is a top view of a mobile robot showing the mobile robot scrubbing a floor surface.

Referring to FIG. 3A, in one example, the robot 100 moves in the birdfoot pattern mentioned above through a footprint area AF on the floor surface 10 on which the cleaning fluid 124 has been applied. The birdfoot pattern depicted involves moving the robot 100 (i) in a forward direction F and a backward or reverse direction A along a center trajectory 300, (ii) in a forward direction F and a reverse direction A along a left trajectory 310, and (iii) in a forward direction F and a reverse direction A along a right trajectory 305. The left trajectory 310 and the right trajectory 305 are arcuate, extending outward in an arc from a starting point along the center trajectory 300. While the right and left trajectories 305, 310 have been described and shown as arcuate, in other implementations, the left trajectory and the right trajectory can be straight line trajectories that extend outward in a straight line from the center trajectory.

In the example of FIG. 3A, the robot 100 moves in a forward direction F from Position A along the center trajectory 300. The robot 100 then moves in a backward direction A along the center trajectory to a distance equal to or greater than the distance to be covered by fluid application. For example, the robot 100 moves backward along the center trajectory 300 by at least one robot length LR to Position G, which may be the same position as Position A. The robot 100 applies the cleaning fluid 124 to an area substantially equal to or less than the footprint area AF of the robot 100. As the robot returns to the wall 20, the cleaning pad 120 passes through the cleaning fluid 124 and cleans the floor surface 10. From Position B, the robot 100 retracts either along a left trajectory 310 or a right trajectory 305 to Position F or Position D, respectively, before going to Position E or Position C, respectively. In some cases, Positions C, E may correspond to Position B. The robot 100 can then continue to complete its remaining trajectories. Each time the robot 100 moves forward and backward along the center trajectory 300, left trajectory 310 and right trajectory 305, the cleaning pad 120 passes through the applied fluid 124, scrubs dirt, debris and other particulate matter from the floor surface 10, and absorbs the dirty fluid away from the floor surface 10. The scrubbing motion of the cleaning pad 120 combined with the solvent characteristics of the cleaning fluid 124 breaks down and loosens dried stains and dirt. The cleaning fluid 124 applied by the robot 100 suspends loosened debris such that the cleaning pad 120 absorbs the suspended debris and wicks it away from the floor surface 10.

Figure 3B:
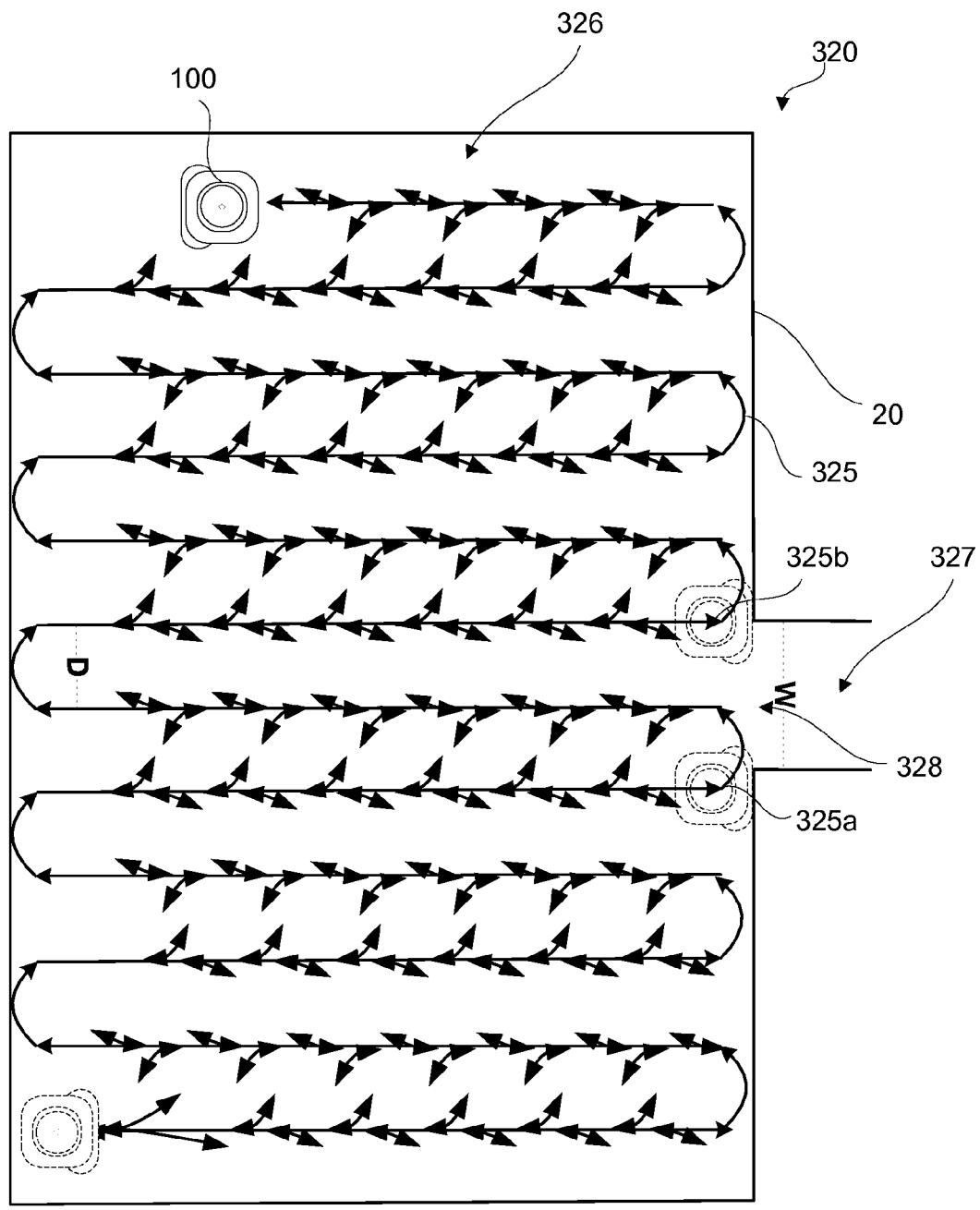
FIG. 3B is a top view of a mobile robot executing a cornrow pattern to clean a room.

Referring to FIG. 3B, the robot 100 can navigate about a room 320 following a path 325 executing a combination of the vine pattern and cornrow pattern described above to cover the floor surface 10 of the room. Each row of the cornrow pattern is spaced apart from adjacent rows by a distance D. In this example, the robot 100 is operating in a cleaning mode requiring use of the cleaning fluid 124, so the robot 100 is applying the cleaning fluid 124 in bursts ahead of the robot 100 along the path 325. The robot 100 advances along the path 325 by performing the vine pattern, which includes repetitions of the birdfoot pattern along each length of the cornrow pattern. With each birdfoot pattern, as described herein, the robot 100 ends up at a location that is generally in a forward direction relative to its initial location.

The path 325 allows the robot 100 to clean a region 326 of the room, but the vine and cornrow pattern of the path 325 can cause the robot 100 to miss cleaning a region 327 of the room. The region 327, which can be, for example, a narrow hallway, has a width W. In some cases, the width W of the region 327 is less than twice a distance D between rows of the cornrow pattern. As a result, when the robot 100 executes the cornrow pattern, the robot 100 may contact the wall 20 without entering the region 327 and thus may be unable to clean the region 327 simply using the cornrow pattern. As described herein, the robot 100, in some implementations, can detect a doorway 328 or other narrow region having a width less than about 2 robot widths that separates the region 327 from the rest of the room 320 based on a wall following routine.

Figure 3C:
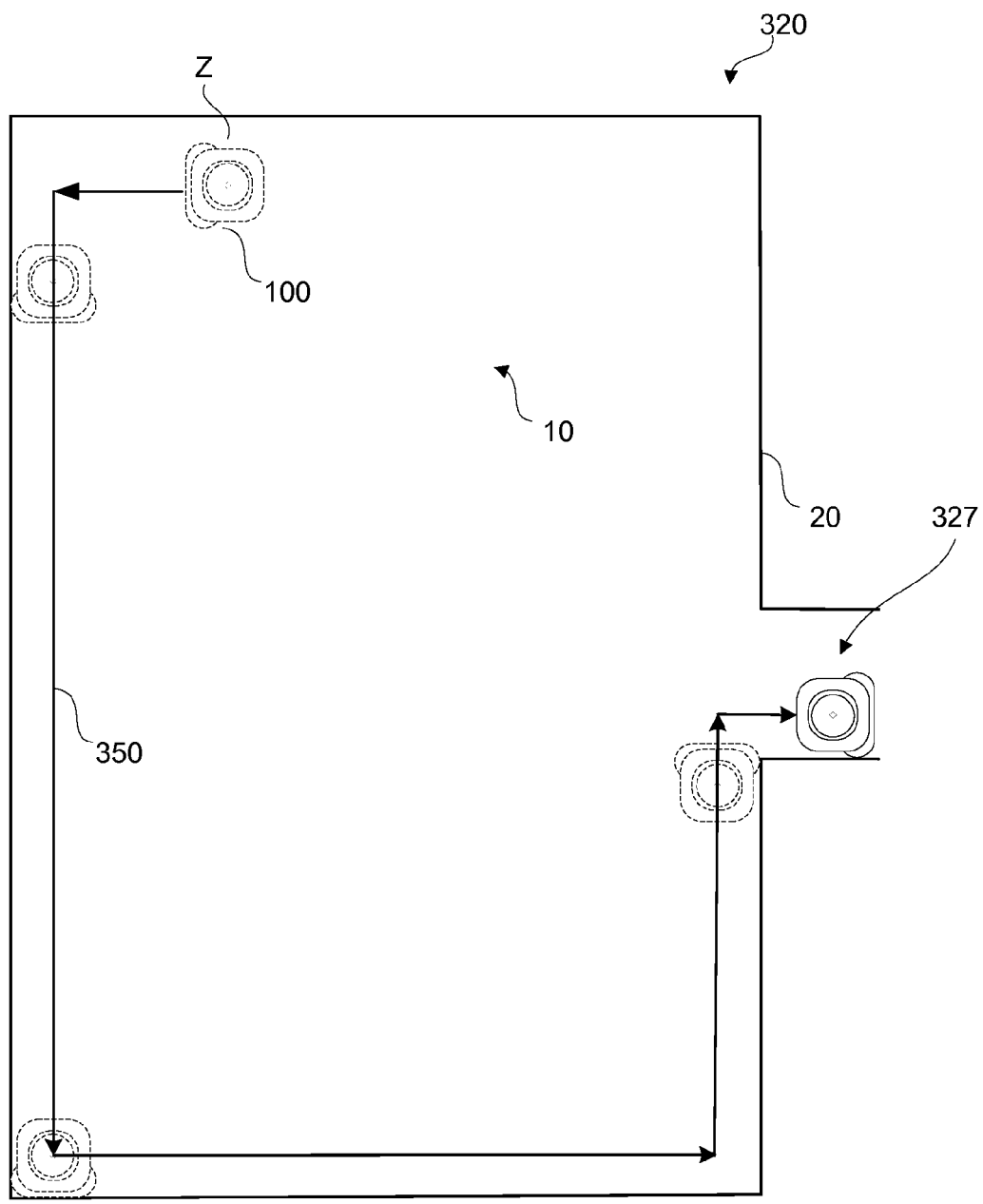
FIG. 3C is a top view of a mobile cleaning a perimeter of the room of FIG. 3B.

Wall following behavior allows the robot 100 to clean along a wall/floor interface (e.g., the wall-floor interface 30 of FIG. 1), clean corners of the room, and find and clean uncleaned regions adjacent to the wall surface 20, such as region 327. Referring to FIG. 3C, subsequent to the area cleaning performed using the cornrow and vine pattern, the robot 100 can perform wall following to clean the perimeter of the room. The robot 100 follows a path 350 as it implements the straight motion pattern by continuously engaging with the wall surface 20 at a slight angle and at a relatively constant force applied to the robot 100. Since the robot 100 is operating in a cleaning mode that uses the cleaning fluid 124, the robot applies the cleaning fluid 124 ahead of the robot 100 along the path 350. In some examples, contacting the wall surface at a slight angle (e.g., the edge of the robot and the wall are not parallel to one another) can provide the advantage of pressing a portion of the cleaning pad against the wall surface such that the entire floor up to the wall is cleaned by the cleaning pad. In some examples, contacting the wall surface at a slight angle can provide the advantage of enabling the robot to determine that it is positioned against the wall (e.g., with the pad extending to the wall) without causing the contact and friction between the robot and the wall surface to impede movement of the robot in the forward direction.

As described herein, the wall following techniques can allow the robot 100 to clean areas that may have been missed during the cornrowing and vining behavior along the path 325 of FIG. 3B. In some cases, simply executing cornrowing and vining behavior can cause the robot 100 to neglect cleaning certain regions of the room due to, for example, obstacles, geometric features of the room, and geometric features of the robot 100. As the robot 100 follows the wall surface 20, the robot 100 can enter the region 327 of the room 320, and a controller of the robot 100 can determine that the robot 100 did not clean the region 327 during the cornrow and vine pattern executed earlier. In some cases, upon finding the region 327, the robot 100 may execute a subsequent cornrow and vine pattern within the region 327. In other cases, the robot 100 may execute wall following, and the controller can determine that the wall following about the wall 20 of the region 327 is sufficient to clean the floor surface of the region 327.

Figure 3D:
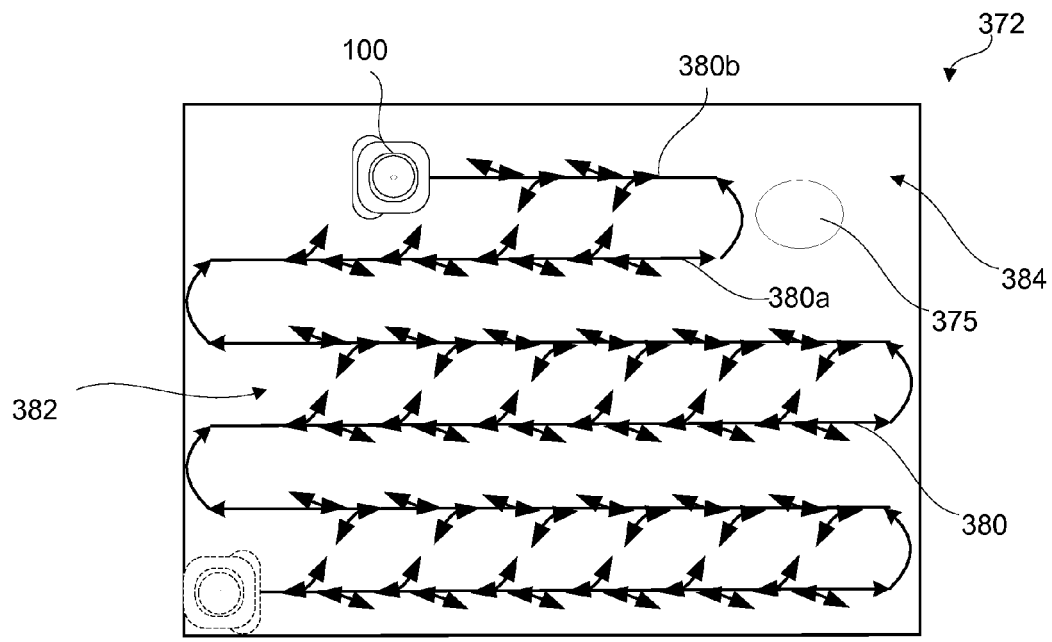
FIGS. 3D to 3H are top views of an example mobile robot cleaning a room with an obstacle.

Referring to FIG. 3D, in another example, the robot 100 navigates around a room 372 with an obstacle 375. The robot 100 executes an area cleaning pattern such as the cornrow pattern through the room 372 by following a path 380 to clean a region 382 of the room 372. However, due to contact with the obstacle 375 (e.g., a toilet), the rows 380a, 380b of the path 380 are shorter than the other rows, and the robot 100 thus does not clean a region 384. Thus, a region (e.g., the region 384) behind or obscured by an obstacle (e.g., the obstacle 375) that is accessible by the robot may remain untraversed during an area cleaning behavior.

Figure 3E:
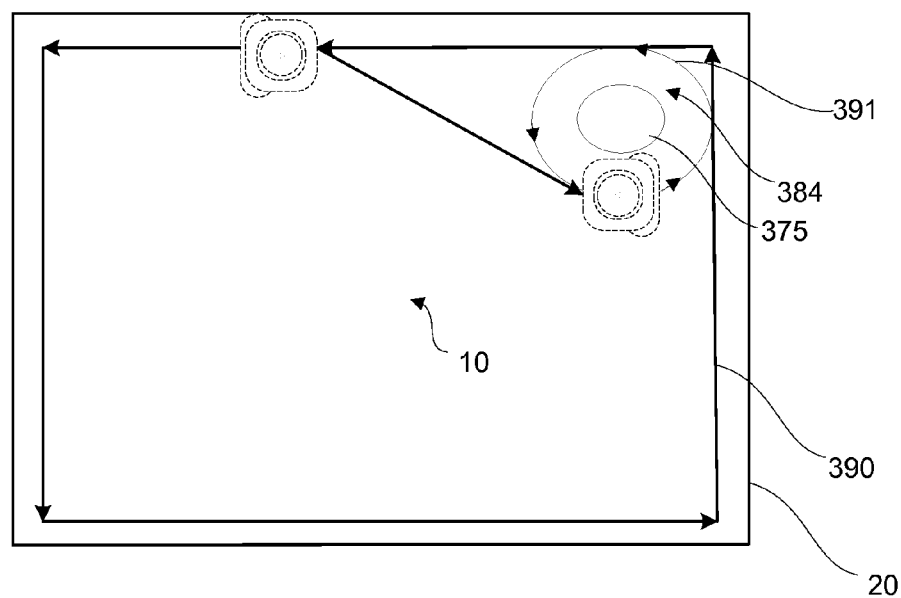

After the robot 100 completes the cornrowing and vining path 380, referring to FIG. 3E, the robot 100 executes wall following along the perimeter of the region 384 by, for example, approaching the wall 20 of the room 372 and following a path 390. The robot 100 maintains contact with the wall 20 by maintaining an average bumper extent within a specified range as it engages the wall 20 to clean along the wall 20 of the room 372. The path 390 allows the robot 100 to clean behind the obstacle 375, which the robot 100 previously was unable to reach in the cornrow and vine pattern.

In some cases, the region 384 may be sufficiently large to warrant execution of a subsequent cornrow and vine pattern in the region 384. As the robot 100 cleans along the wall 20, the robot 100 can recognize that the boundary defined by the wall 20 may not match a boundary determined by the controller when the robot 100 executes the cornrow pattern. The robot 100 then may proceed to find the obstacle 375 and clean around the obstacle 375 by following an obstacle path 391. The robot 100 implements wall following behavior along the lateral surfaces defined by the obstacle 375 such that the robot can clean the interface between the obstacle 375 and the floor surface 10.

Figure 3F:
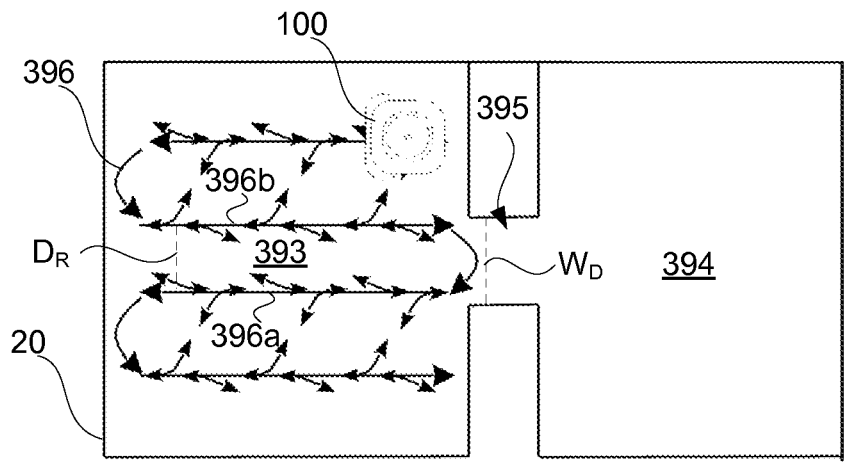
Figure 3G:
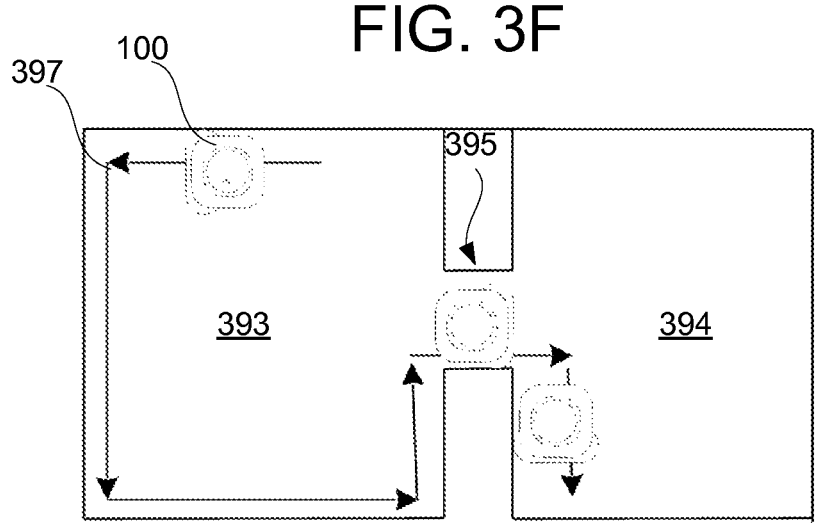
Figure 3H:
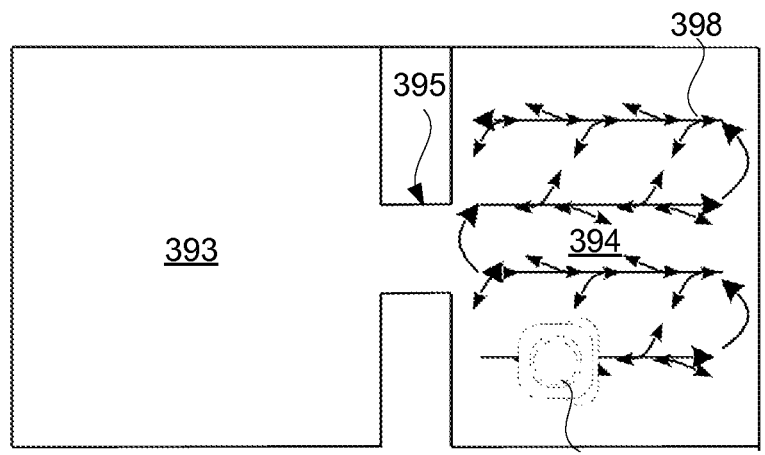

Using the cornrow and vining pattern, the robot 100 can fail to enter passageways that are only slightly larger than the width of the robot (e.g., 1 to 1.2 times larger, 1.2 to 1.4 times larger, 1.4 to 1.6 times larger, 1.6 to 1.8 times larger, 1.8 to 2 times larger). In another example, now referring to FIGS. 3F to 3H, the robot 100 cleans an environment 392 having a first room 393 and a second room 394 separated by a doorway 395. The second room 394 is sufficiently large to warrant the robot 100 to execute a cornrow and vining pattern. As shown in FIG. 3F, the robot 100 executes an area coverage pattern 396, e.g., a cornrow and vine pattern, to clean the first room 393. Using the area coverage pattern 396, the robot 100 fails to clean the doorway 395 and the second room 394 because, as the robot 100 executes row 396a of the area coverage pattern, the robot 100 contacts the wall surface 20 of the environment 392 and cannot gain entry into the second room 394 through the doorway 395. Each row of the cornrow pattern is spaced apart from adjacent rows by a distance $D_R$, which is approximately the width of the robot 100. The doorway 395 has a width $W_D$. In some cases, the width $W_D$ is less than twice the distance $D_R$. As shown in FIG. 3G, the robot 100, upon completing the area coverage pattern 396 in the first room 393, executes a wall follow pattern 397. The robot 100, following the wall follow pattern 397, is able to travel through the doorway 395 and gain access to the second room 394. Now referring to FIG. 3H, the second room 394 is sufficiently large that the robot 100 can execute an area coverage pattern 398 to clean the second room 394. The robot 100, upon gaining access to the second room 394 using the wall follow pattern 397 shown in FIG. 3G, executes the area coverage pattern 398 to clean the second room 394.

Figure 4:
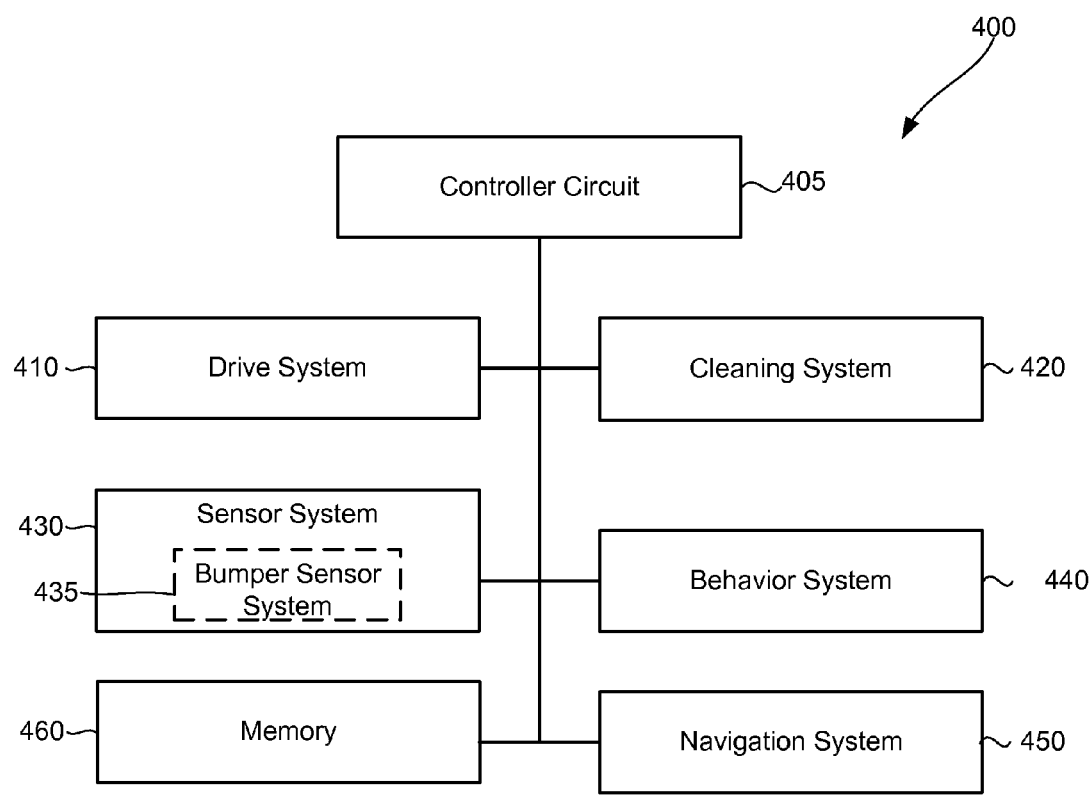
FIG. 4 is a schematic view of the architecture of a controller of the example mobile robot of FIG. 1A.
Figure 7A:
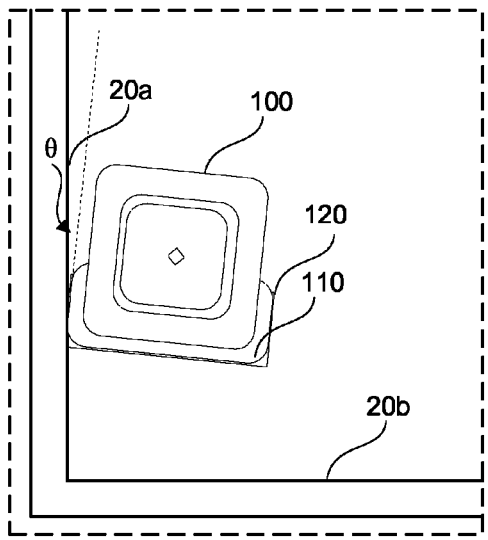
FIG. 7A to 7D depict an example of a mobile robot cleaning a wall surface.
Figure 7B:
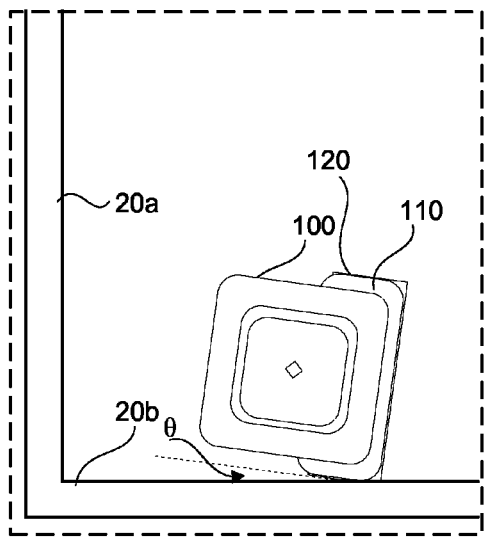
Figure 7C:
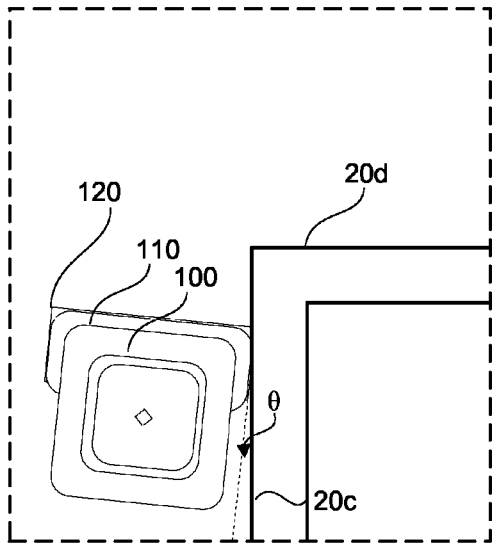
Figure 7D:
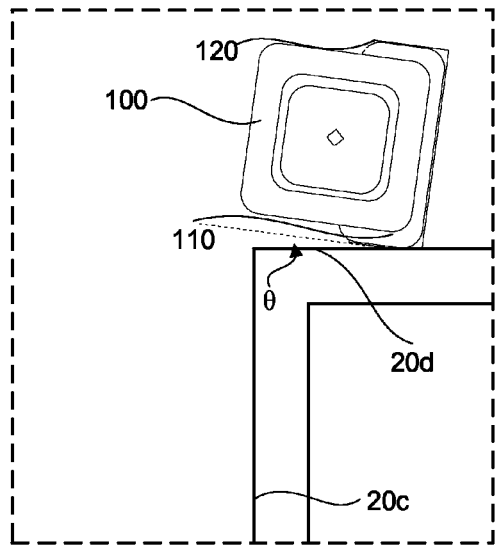

Referring to FIG. 4, an example of a control system 400 of the robot 100 includes a controller circuit 405 (herein also referred to as a controller) that operates a drive 410, a cleaning system 420, a sensor system 430 having a bumper sensor system 435, a behavior system 440, a navigation system 450, and a memory 460.

The drive 410 can include wheels (e.g., the wheels 121 shown in FIG. 1B) to maneuver the robot 100 across the floor surface based on a drive command having x, y, and θ components. The wheels of the drive 410 support the robot body above the floor surface. The controller 405 can further operate a navigation system 450 configured to maneuver the robot 100 about the floor surface. The navigation system 450 bases its navigational commands on the behavior system 440, which can select a navigational pattern or behavior stored in the memory 460. The navigation system 450 also communicates with the sensor system 430, using the bump sensor, accelerometers, and other sensors of the robot, to determine and issue drive commands to the drive 410.

The sensor system 430 can additionally include a 3-axis accelerometer, a 3-axis gyroscope, and rotary encoders for the wheels (e.g., the wheels 121 shown in FIG. 1B). The controller 405 can utilize sensed linear acceleration from the 3-axis accelerometer to estimate the drift in the x and y directions as well and can utilize the 3-axis gyroscope to estimate the drift in the heading or orientation θ of the robot 100. The controller 405 can therefore combine data collected by the rotary encoders, the accelerometer, and the gyroscope to produce estimates of the general pose (e.g., location and orientation) of the robot 100. In some implementations, the robot 100 can use the encoders, accelerometer, and the gyroscope so that the robot 100 remains on generally parallel rows as the robot 100 implements a cornrow pattern. The gyroscope and rotary encoders together can additionally be used by the controller 405 to perform dead reckoning algorithms to determine the location of the robot 100 within its environment. The sensor system 430 also includes the current sensors 123 for the wheels 121 (shown in FIG. 1B). The controller 405 can use the current detected from the current sensor 123 to determine the amount of current being deliver to each wheel 121 and then estimate a speed of the wheel 121.

The controller 405 operates the cleaning system 420 to initiate, for example, spray commands for a certain duration at a certain frequency. The spray commands can be issued according to the spray schedules stored on the memory 460. The controller 405 can also operate the cleaning system 420 to vibrate the cleaning pad 120 to scrub the floor surface 10.

The bumper sensor system 435 of the sensor system 430 includes the bumper sensor assemblies 112L and 112R that detect contact of the bumper 110 with objects in the environment. The controller 405 can implement the bumper sensor system 435 by interpreting the voltages produced by the bumper sensor assemblies 112L and 112R.

Referring back to FIGS. 2A to 2C, using signals from the bumper sensor system 435, the controller 405 can determine an extent to which the left portion 110L of the bumper 110 is compressed (herein also referred to as a left bumper extent), and an extent to the right portion 110R of the bumper 110 is compressed (herein also referred to as a right bumper extent). In other cases, the bumper sensor system 435 can sense that both the left portion 110L and the right portion 110R are in a state a compression, which can indicate contact with an obstacle in the forward direction F of the robot 100, as shown in FIG. 2A. The left bumper extent and the right bumper extent may each be an amount of compression between the compressed state of the bumper 110 and the uncompressed state of the bumper 110.

Referring back to FIG. 1H, the position of the magnets 170L and 170R relative to the sensors 176L and 176R can be set such that the magnets 170L and 170R move relative to the sensors 176L and 176R when the bumper 110 is compressed. As a result, the voltage generated by the sensors 176L and 176R changes as the bumper 110 is compressed. In particular, the voltage generated by the sensor 176L, 176R increases as the magnet 170L, 170R moves closer to the sensor 176L, 176R due to compression of the bumper 110, which includes the bumper chassis 171 that houses the sensor 176L, 176R. The left and right bumper extents are thus linearly proportional to the generated voltages. The controller 405 of the robot 100 can normalize the left bumper extent and the right bumper extent as a percentage, and can determine an average bumper extent of the left bumper extent and the right bumper extent. For each cleaning operation, the controller 405 can also dynamically calibrate the left bumper extent and right bumper extent such that 0% corresponds to the bumper 110 in the uncompressed state and 100% corresponds to the bumper 110 in the compressed state. A negative percent may indicate an extension of the bumper 110. As described herein, the control system 400 can utilize the bumper sensor system 435 and the detected left and right bumper extents to implement wall following behaviors that allow the robot 100 to track the surface of a wall or other obstacle (such as a bathroom fixture) and thereby clean hard-to-access corners and crevices defined by intersections of floor surfaces and wall surfaces. For example, when following a wall, the bumper 110 of the robot 100 will be partially compressed due to the friction between the bumper 110 and the wall. The robot 100 can maintain contact with the wall by maintaining the extent of bumper compression and the difference between the left and the right bumper compression by continuously adjusting the rotational and translational speeds of the robot 100 to maintain nearly constant compression.

In other cases, the robot 100 can compute a difference between the left bumper extent and the right bumper extent. A positive difference indicates that the left bumper extent is greater than the right bumper extent, and a negative difference indicates the right bumper extent is greater than the left bumper extent. When the robot 100 is performing wall following such that the left portion 110L of the bumper 110 is adjacent the wall surface 20a, the robot 100 can maintain the difference to be within a range of, for example, 0% to 10%, 5% to 15%, 4% to 20%. When the robot 100 is wall following such that the right portion 110R of the bumper 110 is adjacent the wall surface 20a, the controller 405 of the robot 100 can maintain the difference to be within a range of, for example, −5% to −15%, −10% to 0%, −20% to −4%, by issuing drive commands to the drive 410. The controller 405 can alternatively determine an average of the left bumper extent and the right bumper extent.

The memory 460 can be loaded with thresholds and limits related to the normalized average bumper extents, as described herein. The memory 460 can also be loaded with a static calibration result performed during manufacturing of the robot 100. The static calibration can define a range within which the robot considers dynamic calibration described to be valid. In some examples, as the robot is used repeatedly, the positions of the posts holding the bumper will change by a small amount. In order to account for such changes, a calibration process can be used to determine whether the non-compressed position of the bumper and associated sensor reading have changed. This calibration can be performed upon starting up the robot before each cleaning mission and/or can be performed dynamically every 5-10 seconds during cleaning.

Referring back to FIGS. 1A, 3C, and 4, as the robot 100 follows the wall 20 of the room 320, the robot 100 can implement specific processes that allow the robot 100 to clean the floor surface 10 that closely abuts the wall surface 20. The controller 405 can control movement of the robot body 102 to cause the body 102 to track the wall surface 20 based on a value of the average bumper extent. The value is based on the signal or signals generated by the bumper sensor system 435 (e.g., the bumper sensor assemblies 112L and 112R) and can indicate that the bumper 110 is partially compressed such that the values are within a compression range or interval between the uncompressed state and the compressed state. The controller 405 can then determine whether the bumper 110 is within the compression range or interval (e.g., based on the normalized bumper extent). For example, the controller 405 may determine that the bumper has reached a threshold compression level for wall following, e.g., 2% to 2.5%, 2.5% to 3%, 3% to 3.5%, 3.5% to 4%, 4% to 4.5%, 4.5% to 5%, 5% to 5.5%, 5.5% to 6%, 6% to 6.5%, 6.5% to 7%, 7% to 7.5%. Wall following processes may then be executed and continue unabated so long as the bumper remains compressed within a predefined range between the compressed and uncompressed state (e.g., 2% to 5%, 2.5% to 7.5%, 5% to 10%, 5% to 15%, 7.5% to 12.5%, 10% to 15%, 5% to 20%, 10% to 20%). That is, the wall-following processes continue so long as the amount of force between the bumper and the robot remains within a specified range. The robot 100 can maintain the amount of force within the specified range by continuously adjusting the rotational and translational speeds of the robot 100 to maintain nearly constant compression of the bumper. If the amount of compression exceeds the upper threshold (e.g., 20%), then the wall following processes may cease, and other processes may take over control of the robot to either reestablish pattern traversal or to reengage a wall or other obstacle to continue wall following, as described herein.

Within the predefined range or interval, the controller 405 of the robot 100 can also maintain the average bumper extent and, in some cases, a difference between the left and right bumper extents by continuously adjusting its rotational and translational speeds to maintain nearly constant compression. While wall following, the robot 100 can travel at a nominal translational speed (e.g., 50 mm/s to 150 mm/s, 150 mm/s to 250 mm/s, 250 mm/s to 350 mm/s) while not rotating. When the average bumper extent deviates from a target average bumper extent stored on the memory 460, the controller 405 can deliver a drive command to the drive 410 to reduce the speed of the robot 100 an amount proportional to the deviation. When the bumper extent difference deviates from a target difference stored on the memory 460, the controller 405 can deliver a drive command to the drive 410 to increase the rotational velocity of the robot 100 an amount proportional to the deviation. In some implementations, the rotational and translational speeds can be adjusted an amount proportional to the rate of change of the average bump extent and the bump extent difference, respectively.

In some cases the uncompressed position may vary from one cleaning operation to another cleaning operation due to positional variations in the resilient posts 164 (shown in FIG. 1F) that mount the bumper 110 to the robot body 102. During a cleaning operation, the controller 405 can dynamically calibrate the uncompressed position to account for the variations in a position of the bumper 110 relative to the robot body 102. The controller 405 can calibrate an initial position of the bumper (when the bumper is not contacting a wall surface) relative to the resilient posts 164 at the start of the cleaning operation. For example, the voltage signals of the bumper sensor assemblies 112L and 112R while the bumper is in the neutral position can be set to correspond to the uncompressed position. In other words, those voltage signals can indicate a normalized average bumper extent of 0%. As described above, the memory 460 may include a range of valid voltages (and thus a range of valid calibrations) that can generally indicate a normalized average bumper extent of 0%

FIGS. 5A to 5F show an example of behavior that the robot 100 can implement to clean along the wall 20 of a room. In this example, the wall surface 20 includes an inside corner 500, which is defined by the intersection of a wall surface 20a and a wall surface 20b.

Referring to FIG. 5A, the robot 100 approaches the inside corner 500 executing a wall following behavior. During the wall following behavior, the robot 100 places the cleaning pad against the wall surface 20a so that the cleaning pad can clean the interface between the wall 20 and the floor surface 10 (e.g., the wall-floor interface 30 of FIG. 1). The robot 100 can achieve such proximity with the wall surface 20 by contacting the wall surface 20a with the bumper 110 of the robot 100. Contact is at a slight angle (e.g., between about 1 degree and about 10 degrees, between about 3 degrees and about 15 degrees, between about 3 degrees and about 20 degrees, between about 5 degrees and about 20 degrees, between about 3 degrees and about 10 degrees, between about 10 degrees and about 20 degrees) so as to maintain sufficient contact force between the wall 20 and the bumper 110 and to continue wall following for at least as long as the force is maintained. In this example, the robot 100 contacts the wall surface 20a with the right portion 110R of the bumper 110 so that the cleaning pad can follow the wall-floor interface (e.g., the wall-floor interface 30 of FIG. 1). Contact sufficient for wall following is detected when the amount of force between the bumper and the wall is within a desired range of compression with the bumper 110 partially compressed.

During wall following, the robot 100 can position itself against the wall so as to maintain the bumper 110 in a partially compressed state such that the average bumper extent is within a predetermined interval (e.g., the compression range or interval), which can be, for example, 0% to 5%, 2.5% to 7.5%, 5% to 10%, 5% to 15%, 5% to 20%, 7.5% to 10%, 7.5% to 12.5%, 10% to 15%, 10% to 20%. In some examples, above this interval, the robot 100 may press the bumper 110 against the wall surface 20a with too much force, which can impede the forward movement of the robot 100 and/or indicative of an obstacle. Below this interval, the robot 100 may not press the bumper 110 sufficiently hard against the wall surface 20b to allow the cleaning pad 120 to reach the crevices and corners defined by the floor surface 10 and the wall surface 20a. If the controller 405 detects force above the foregoing interval, the controller 405 may initiate operations to move the robot away from the wall, and either reengage with the wall (for further wall following) or disengage with the wall. If the controller 405 detects force below the foregoing interval, the controller may initiate operations to move the robot in further contact with the wall or commence a coverage pattern, such as the cornrow and vine pattern.

Referring to FIG. 5B, in this example, the robot 100 follows the wall surface 20a until it contacts the wall surface 20b with the front portion 110F of the bumper 110. Upon contacting the wall surface 20b with the front portion 110F, the average bumper extent increases beyond an upper threshold bumper extent for wall following, indicating that the robot 100 is pushing against a surface (e.g., the wall surface 20b) with the front portion 110F of the bumper 110. The upper threshold of the normalized average bumper extent can be, for example, 7% to 8%, 7.5% to 8%, 8% to 9%, 9% to 10%, 10% to 11%, 11% to 12%, 12 to 13%, 13% to 14%, 14% to 15%, 15% to 16%, 16% to 17%, 17% to 18%, 18% to 19%, 19% to 20%. In some cases, based on signals from the current sensors 123 and/or the encoders, the controller 405 can determine that the wheels of the robot 100 are moving slower than a predetermined speed, thus indicating the robot 100 is no longer advancing along the wall surface 20*a*. A force on the bumper 110 of the robot 100 can be estimated based on the speed of the wheels as compared to the current delivered to the wheels. The speed of a wheel divided by the current delivered to the wheel is proportional to the force on the wheel, so the controller 405 can compute a force on each wheel. The controller 405 can determine the speed of the wheels based on signals from encoders operable with the wheels and the current of the wheels based on signals from the current sensors 123 of the wheels. The controller 405 can then estimate the force on each wheel, compute the difference between the estimated forces, and compute the torque about a center of mass of the robot based on the difference. The controller 405 can compute a force on the bumper 110 based on the torque. In some implementations, the memory 460 can include a target force range (e.g., 0.1 N to 0.2 N, 0.1 N to 0.3 N, 0.1 N to 0.5 N, 0.5 N to 1 N) that the controller 405 can maintain while the bumper 110 contacts vertically oriented surfaces.

In FIGS. 5C, 5D, and 5E, the robot 100 seeks to re-engage wall following behavior along the wall surface 20*b* (e.g., on the other wall of the corner). Referring to FIG. 5C, when the average bumper extent exceeds the threshold bumper extent, the robot 100 can respond by stopping forward movement and reverse driving the robot 100 such that the robot 100 backs away from the wall surface 20*b* so that the bumper 110 no longer is in a compressed state. The robot 100 can continue backing up until the average bumper extent decreases below a lower threshold of the bumper extent, which can be, for example, 7.5% to 7%, 7% to 6%, 6% to 5%, 5% to 4%, 4% to 3%, 3% to 2%, 2% to 1%, 1% to 0%, less than 0%. Once the average bumper extent decreases below the lower threshold, the robot 100 can continue backing up so that the bumper 110 is a predetermined backing up distance BD from the wall surface 20*b*. The distance BD can be selected such that the robot 100 has sufficient space to turn around and begin wall following along the wall surface 20*b*. In some cases, the distance BD can be, for example, 5 mm to 10 mm, 10 mm to 15 mm, 15 mm to 20 mm, 20 mm to 25 mm, 25 mm to 30 mm, 30 mm to 35 mm, about 10 mm, about 20 mm, about 30 mm. The controller 405 can estimate the distance of the bumper 110 from the wall surface 20*b* by using signals outputted by the accelerometer and/or wheel encoders of the sensor system 430 and can compare the estimated distance to the distance BD.

Referring to FIG. 5D, in this example, the robot 100 turns away from the wall surface 20*a* so that the robot 100 can orient its forward drive direction F in a direction substantially parallel with the wall surface 20*b* (e.g., perpendicular to the prior direction of travel in cases of a 90-degree corner. Referring to FIG. 5E, the robot 100 then re-engages wall following behavior with the wall surface 20*b*. At this point, the robot 100 can continue to engage the right portion 110R of the bumper 110 with the wall surface 20*b* until the average bumper extent is within the predetermined interval described herein. After the robot 100 has re-engaged the wall following behavior, now referring to FIG. 5F, the robot 100 continues to execute wall following behavior along the wall surface 20*b* by maintaining force against the wall so that the average bumper extent remains within the predetermined interval. The robot 100 can cause the bumper extent to increase by maintaining contact of the right portion 110R of the bumper 110 with the wall surface 20*b*.

FIGS. 6A to 6E illustrate an example of behavior that the robot 100 can implement to clean the wall 20 including an outside corner 600, which is defined by the intersection of a wall surface 20*c* and a wall surface 20*d*.

Referring to FIG. 6A, the robot 100 approaches the outside corner 600 executing a wall following behavior. During the wall following behavior, the robot 100 places the cleaning pad closely against the wall surface 20*c* so that the cleaning pad can clean the interface between the floor surface 10 and the wall 20 (e.g., the wall-floor interface 30 of FIG. 1). The robot 100 can achieve such proximity with the wall surface 20 by contacting the wall surface 20*c* with the bumper 110 of the robot 100, either tangentially or at a slight angle (e.g., between about 1 degree and about 10 degrees, between about 3 degrees and about 15 degrees, between about 3 degrees and about 20 degrees, between about 5 degrees and about 20 degrees, between about 3 degrees and about 10 degrees, between about 10 degrees and about 20 degrees) between the wall surface 20 and the bumper 110. For example, the robot 100 contacts the wall surface 20*c* with the right portion 110R of the bumper 110 so that the cleaning pad can follow the wall-floor interface. During wall following, the robot 100 can maintain the bumper 110 compression such that the average bumper extent is within the predetermined interval described herein. Above this interval, the robot 100 may be pressing the bumper 110 against the wall surface 20*c* with too much force, which can impede the forward movement of the robot 100. Below this interval, the robot 100 may not be pressing the bumper 110 sufficiently hard against the wall surface 20*d* to allow the cleaning pad 120 to reach the crevices and corners defined by the floor surface 10 and the wall surface 20*c*. In some implementations, smaller force thresholds can increase the relative effect of noise, making it more likely that the robot 100 fails to closely follow corners.

Referring to FIG. 6B, in an example implementation, the robot 100 follows the wall surface 20*c* until it detects that the average bumper extent is no longer within the predetermined interval. In particular, the robot 100 can detect that the bumper 110 has lost contact with the wall surface 20*c* and that the average bumper extent is below a lower threshold bumper extent (e.g., the bumper 110 is no longer partially depressed). When the right portion 110R of the bumper 110 loses contact with the wall surface 20*c*, in this example, the average bumper extent decreases below the lower threshold bumper extent because the friction force between the wall surface 20*c* and the right portion 110R no longer compresses the bumper 110. The decrease in the average bumper extent indicates that the robot 100 is no longer wall following. The lower threshold of the bumper extent can be, for example, 7.5% to 7%, 7% to 6%, 6% to 5%, 5% to 4%, 4% to 3%, 34% to 2%, 2% to 1%, 1% to 0%, less than 0%. Upon detection that the bumper 110 has lost contact, the robot 100 can cease forward movement.

In FIGS. 6C and 6D, the robot 100 seeks to re-engage wall following behavior along the wall surface 20*d*. Referring to FIGS. 6C and 6D, when the average bumper extent is below the lower threshold bumper extent, the robot 100 can respond by turning toward the direction of the originally followed wall 20*c* and slowly advancing the robot 100 until the right portion 110R of the bumper 110 engages with the wall surface 20*d*. In some implementations, upon determining that the average bumper is below the lower threshold bumper extent, the controller 405 of the robot 100 can issue a drive command to the drive 410 to cause the wheels of the robot 100 to reverse direction so as to move the robot 100 in the rearward direction A. After the controller 405 determines that the robot 100 has moved the predetermined distance in the rearward direction A based on, for example, signals from encoders of the wheels, the controller issues a drive command to the drive 410 that causes the wheels of the robot 100 to turn the robot 100 so that the forward drive direction F is substantially parallel to the wall surface 20d. In some cases, the drive command causes the wheels to turn the robot 100 so that the forward drive direction F forms the slight angle (e.g., between about 1 degree and about 10 degrees, between about 3 degrees and about 15 degrees, between about 3 degrees and about 20 degrees, between about 5 degrees and about 20 degrees, between about 3 degrees and about 10 degrees, between about 10 degrees and about 20 degrees) with the wall surface 20d.

After the robot 100 has re-engaged the wall following behavior with the wall surface 20d, now referring to FIG. 6E, the robot 100 continues to execute wall following behavior along the wall surface 20b by maintaining the average bumper extent within the predetermined interval.

Referring back to FIG. 3B, in some implementations, the robot can detect a doorway 328 by engaging with the wall surface 20 at points 325a and 325b that flank the doorway 328. At the points 325a and 325b, the robot 100 contacts the wall surface 20 such that about only half of the front of the bumper is in contact with the wall surface 20. In some cases, about 25% to 75%, 40% to 60%, 45% to 55% of the front of the bumper is in contact with the wall surface 20. At the point 325a, the controller 405 of the robot 100 can, based on the bumper extent detected by the left bumper sensor assembly 112L and the bumper extent detected by the right bumper sensor assembly 112R, determine that the right portion 110R of the bumper 110 has engaged with the wall surface 20 and the left portion 110L of the bumper 110 has not engaged with the wall surface 20. The controller 405 can thus determine that the wall surface 20 may not continue from where the right portion 110R contacts the wall surface 20 to where the left portion 110L is positioned. At the point 325b, the controller 405 can determine that the left portion 110L of the bumper 110 has engaged with the wall surface 20 and the right portion 110R of the bumper 110 has not engaged with the wall surface 20. The controller 405 can thus determine that the wall surface 20 may not continue from where the left portion 110L contacts the wall surface 20 to where the right portion 110R is positioned. Based on the contact with the bumper 110 at points 325a, 325b, the controller 405 can determine that an opening—such as the doorway 328—exists between the points 325a, 325b. The controller 405 can compute a distance between the point 325a, 325b—which is approximately 2D—and determine that the 328 has a width W less than 2D.

As shown in FIGS. 5A, 5F, 6A, and 6E, the robot 100 follows wall surfaces 20a and 20b by maintaining contact between the right portion 110R of the bumper 110 with the wall surfaces 20a and 20b. In some implementations, the robot 100 can additionally and/or alternatively follow wall surfaces or vertically oriented surface by maintaining contact between the left portion 110L of the bumper 110 with the wall surfaces. The contact generates a friction that causes compression of the bumper 110, which the robot seeks to maintain within the predetermined interval in some implementations. In some implementations, the cleaning pad 120 may extend beyond the bumper 110, and the cleaning pad 120 and the bumper 110 can be configured such that forces exerted on the cleaning pad 120 transfer to the bumper 110. For example, referring to FIG. 1G, the resilient posts 164 can mechanically connect the cleaning pad 120 with the bumper 110. As a result, friction forces on the cleaning pad 120 can compress the bumper and thus increase the average bumper extent.

Referring to FIGS. 7A to 7D, the robot 100 can maintain contact between the cleaning pad 120 and the wall surfaces 20a and 20b while maintaining contact between the bumper 110 and the wall surfaces 20a, 20b, 20c, and 20d by following the wall surfaces such that the forward drive direction F and the wall surfaces 20a, 20b, 20c, and 20d form a slight angle θ (e.g., between about 1 degree and about 10 degrees, between about 3 degrees and about 15 degrees, between about 3 degrees and about 20 degrees, between about 5 degrees and about 20 degrees, between about 3 degrees and about 10 degrees, between about 10 degrees and about 20 degrees). The predetermined interval can be within a similar interval as the interval described with respect to FIGS. 5A, 5F, 6A, and 6E (e.g., 0% to 5%, 2.5% to 7.5%, 5% to 10%, 5% to 15%, 5% to 20%, 7.5% to 10%, 7.5% to 12.5%, 10% to 15%, 10% to 20%). In some cases, the predetermined interval may be greater than the predetermined interval used in the cases described with respect to FIGS. 5A, 5F, 6A, and 6E so that the amount of friction is sufficient between the cleaning pad 120 and the wall surface. For example, the interval can be greater by, for example, 0% to 1%, 1% to 2%, 2% to 3%, 3% to 4%, 4% to 5%, about 1%, about 2%, about 3%. To sufficiently compress the cleaning pad 120, the robot 100 can orient itself so that the forward drive direction F of the robot 100 forms the slight angle θ with the wall surfaces 20a, 20b, 20c, and 20d. The angle θ allows a part of the forward drive direction F to push the cleaning pad 120 into the wall surfaces 20a, 20b, 20c, and 20d, thus generating greater compressive forces on the cleaning pad 120 and greater frictional forces on the bumper 110.

Figure 8:
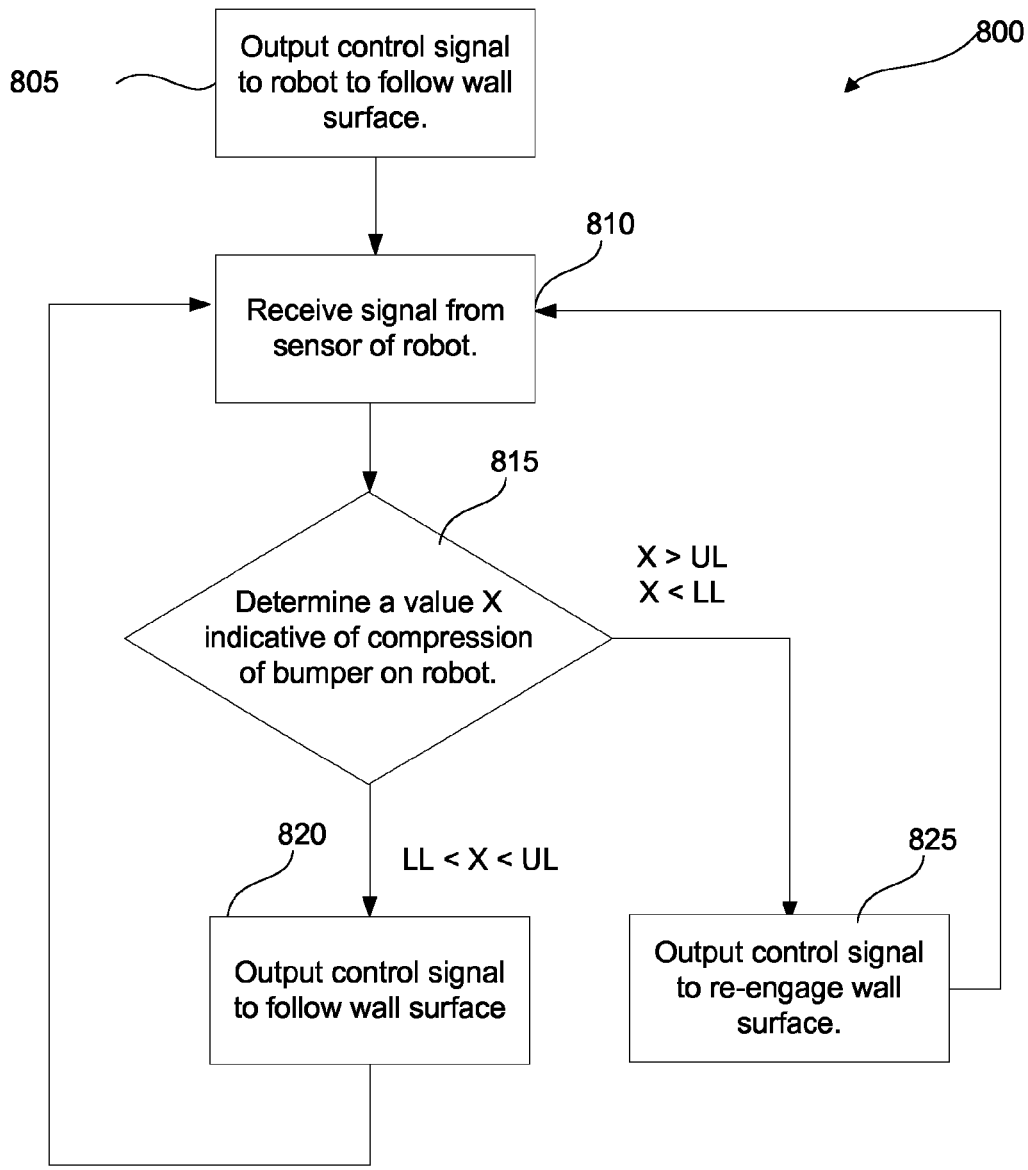
FIG. 8 is a flow chart showing a process implemented by a mobile robot to follow a wall surface.

Referring to FIG. 8, a flow chart 800 illustrates an example method of implementing a wall following behavior.

At operation 805, a controller of a robot outputs a control signal to the robot to follow a wall surface. The controller may output the control signal after detecting that the robot has completed cornrow and vine behavior. The robot may be following a wall surface having a first surface portion and a second surface portion. The first and second surface portions may define a corner, as is described with respect to FIGS. 5A to 5F and 6A to 6E. In some implementations, the controller is programmed to dynamically calibrate a position of the bumper relative to the robot body. The calibration occurs prior to wall following when the robot is not expected to be in contact with a vertically oriented surface or obstacle that causes the bumper of the robot to be compressed. If the measured position is not within a predefined range, the controller of the robot can issue a drive command that causes the robot to move to an open area to ensure that the bumper of the robot is not contacting an obstacle. The controller can also issue a drive command to stop movement of the robot to avoid inadvertent forces on the bumper. The predefined range can be a static calibration performed during manufacturing, as described above. The dynamic calibration can occur before the controller outputs a control signal to follow the wall surface.

At operation 810, the controller receives a signal from a linear sensor on the robot. The robot can be implementing wall following such that a bumper of the robot is contacting a first wall surface. The sensor can be, for example, the bumper sensor assembly 112R, 112L as described herein. The signal can be voltage, current, frequency, or other electrical signal. The sensor produces a variable signal in response to movement of a bumper relative to a body of the robot. The signal changes in response to contact between the bumper and the wall surface, and the signal can vary linearly with the movement of the bumper relative to the body. The controller can receive two or more signals from two or more sensors on the robot. A first sensor can produce a first signal in response to movement of the bumper, and a second sensor can produce a second signal in response to movement of the bumper. The first and second signals can vary linearly with the movement of the bumper. In some examples, the bumper position is determined based on an average of the two linear sensor values.

At operation 815, the controller determines a value X indicative of compression of a bumper on the robot. The value X can be, for example, a bumper extent. The controller can control the movement of the body of the robot based on the determine value X. The controller can cause the body to track or follow the wall surface based on the value X. In cases where the robot has more than one sensor to detect movement of the bumper, the controller can calculate the value X based on separate values from each of the sensors. The value X can be based on the signal from the linear sensor, and the controller can determine whether the bumper is within a compression range between an uncompressed position and a partially compressed position based on the value X. When the controller determines the value X based on two or more signals that vary linearly with an amount of force between the robot and the wall surface, the value X is additionally or alternatively indicative of an angle at which the robot engages the surface. The angle can be based on two or more sensor signals that are indicative of the value X. The controller can control the angle at which the robot engages the wall surface based on the value X. In some implementations, the controller can control an amount of force with which the robot engages the wall surface.

If the value X is above a lower limit LL and below an upper limit UL of a compression range, at operation 820, the controller outputs a control signal to follow the wall surface by issuing a drive signal to cause the robot to continue in the forward drive direction. The control signal may be the same as the control signal outputted at operation 805. In some cases, the control signal may adjust a drive of the robot in order to maintain the value X within an optimal value. In some cases, the value X can be based on the signal from the sensor and can indicate that the bumper is within the compression range between the uncompressed position and the compressed position. If the value X is the average normalized bumper extent, the lower limit LL of the compression range may be, for example, 7.5% to 7%, 7% to 6%, 6% to 5%, 5% to 4%, 4% to 3%, 34% to 2%, 2% to 1%, 1% to 0%, less than 0%. The upper limit of the compression range may be, for example, 7% to 8%, 7.5% to 8%, 8% to 9%, 9% to 10%, 10% to 11%, 11% to 12%, 12 to 13%, 13% to 14%, 14% to 15%, 15% to 16%, 16% to 17%, 17% to 18%, 18% to 19%, 19% to 20%. The optimal value may be the average of the lower limit LL and the upper limit UL. In some implementations, the lower limit LL can be between approximately 0% and 7.5% or less, and the upper limit can be between approximately 7.5% and 15% or more. Keeping the average bumper extent within this predetermined interval or compression range can be beneficial in maintaining the mobility of the robot while facilitating cleaning of corners and crevices defined by the first wall surface. The control signal can cause the robot to follow the wall surface that the robot followed at operation 805 by maintaining the value X within the predetermined interval or compression range. The controller can be programmed to control movement of the robot body to track the wall surface to maintain the value X within the compression range.

If the value X is below the lower limit LL or above the upper limit UL of the compression range, at operation 825, the controller outputs a control signal to re-engage the wall surface. The controller can be programmed to control movement of the robot body to cause the robot body to retreat from the wall surface in response to the value being outside the compression range. In some implementations, the controller can receive a signal from a sensor that detects a speed of the wheels. The sensor can be, for example, encoders or current sensors operable with wheel. Based on, for example, the speed of the wheels and the bumper sensors, the controller can control the robot to retreat from the wall surface, to turn-away from the wall surface, and then to re-engage the wall surface. In cases when the value X is above the upper limit UL, the controller can implement the re-engagement behavior as described with respect to FIGS. 5B to 5E above. For example, the controller can deliver a control signal to cause the robot to stop forward movement momentarily and then retreat away from the wall surface. The control signal can also cause the robot to turn-away from the wall surface, and then re-engage with the wall surface. In cases when the value X is below the lower limit LL, which can indicate a loss of contact between the bumper and the wall surface, the controller can implement the re-engagement behavior as described with respect to FIG. 6B to 6D above. The controller can deliver a control signal to cause the robot to stop forward movement momentarily and, in some implementations, cause the robot to retreat toward the wall surface. The control signal can then cause the robot to turn toward the wall surface and then re-engage with the wall surface.

While the magnets 170L and 170R and the sensors 176L and 176R have been described to be positioned such that compression of the bumper 110 results in an increase in the voltage generated by the sensors 176L and 176R, in other implementations, the magnets and the sensors can be positioned such that the magnets are farther from the sensors as the bumper is compressed. In such implementations, the sensors generate a smaller voltage upon compression of the bumper.

While the navigational behaviors described above have been explained with respect to the robot 100 executing wet cleaning, in some cases, the robot 100 may execute dry cleaning and may not incorporate all of the above described navigational behaviors—or may incorporate additional behaviors—in a cleaning operation. For example, the robot 100 may execute the cornrow pattern without the vine pattern.

In some examples, the robot knows the location of a surface that is has previously traversed by storing those locations on a map stored on the non-transitory-memory 460 of the robot or on an external storage medium accessible by the robot through wired or wireless media during a cleaning run. In some implementations, the robot includes an upward-facing camera and/or one or more ranging lasers for building such a map of a space. In some examples, the controller 405 uses a map of walls, furniture, flooring changes and other obstacles to position and pose the robot at locations far enough away from obstacles and/or flooring changes prior to the application of cleaning fluid.

While a bumper has been described to detect the amount of force on the robot, in some implementations, a force sensor, a pressure sensor, or some other sensor disposed on the robot can be used to sense the force. The example wall following techniques described herein can be controlled or implemented, at least in part, using one or more computer program products, e.g., one or more computer programs tangibly embodied in one or more information carriers, such as one or more non-transitory machine-readable storage media, for execution by, or to control the operation of, one or more data processing apparatus, e.g., a programmable processor, a computer, multiple computers, and/or programmable logic components.

While in some examples described above, the wall following behavior is used to clean a perimeter of a room or other space subsequent to completion of an area cleaning behavior, in other examples, the wall following behavior can be used to allow the robot to escape from a cluttered environment or a bounded area. For example, if the robot enters a space with a narrow opening for entry/exit, the robot may become stuck within the space and normal coverage patterns may not align with the entry/exit to allow the robot to escape. In such situations, the robot can determine that it is in a cluttered environment and execute a wall following behavior to escape from the area. Following the wall allows the robot to identify a narrow exit that the robot might otherwise have difficulty locating. In one particular example, a robot can execute a random traversal cleaning pattern and upon identifying that the robot has repeatedly traversed the same area (e.g., is trapped in a small space or cluttered area) the robot can execute a wall following behavior to exit or escape the area.

A computer program can be written in any form of programming language, including compiled or interpreted languages, and it can be deployed in any form, including as a stand-alone program or as a module, component, subroutine, or other unit suitable for use in a computing environment.

Operations associated with implementing all or part of the wall following techniques described herein can be performed by one or more programmable processors executing one or more computer programs to perform the functions described herein. Control over all or part of the wall following techniques described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A mobile cleaning robot comprising:
    a body that is movable relative to a wall surface;
    a reservoir configured to hold a fluid;
    a spraying mechanism configured to dispense the fluid from the robot;
    a bumper mounted to the body, the bumper being movable relative to the body between a fully uncompressed position and a fully compressed position;
    a cleaning pad removably attached to a bottom of the body, the cleaning pad extending beyond a width of the bumper; and
    a controller to execute instructions to perform operations comprising:
        advancing the robot along a first portion of the wall surface while causing the bumper to be positioned within a predefined range between the fully uncompressed position and the fully compressed position to maintain an angle between the body and the first portion of the wall surface and to maintain contact between the cleaning pad and the first portion of the wall surface, and,
        in response to the bumper being positioned between the predefined range and the fully compressed position when the bumper contacts a second portion of the wall surface, controlling the robot to
            retreat from the second portion of the wall surface until the bumper is positioned between the predefined range and the fully uncompressed position,
            turn away from the first portion of the wall surface,
            engage the second portion of the wall surface such that the bumper is positioned within the predefined range, and then
            advance along the second portion of the wall surface while causing the bumper to be positioned within the predefined range to maintain an angle between the body and the second portion of the wall surface and to maintain contact between the cleaning pad and the second portion of the wall surface.

2. The mobile cleaning robot of claim 1, wherein:
    advancing the robot along the first portion of the wall surface comprises advancing the robot so that at least one of a right side and a left side of the body is non-parallel to the wall surface.

3. The mobile cleaning robot of claim 1, wherein advancing the robot along the first portion of the wall surface comprises adjusting rotational and translational speeds of the robot to maintain the bumper within the predefined range.

4. The mobile cleaning robot of claim 1, wherein:
    the robot further comprises a sensor to produce a signal in response to movement of the bumper relative to the body caused by contact between the bumper and the wall surface, the signal varying linearly with the movement of the bumper relative to the body; and
    advancing the robot along the first portion of the wall surface comprises advancing the robot along the first portion of the wall surface based at least in part on a value indicative of an amount of compression of the bumper, the value being based on the signal and indicating that the bumper is positioned within the predefined range.

5. The mobile cleaning robot of claim 4, wherein the sensor comprises:
    a post mounted to the bumper;
    a magnet mounted to the post; and
    a Hall effect sensor mounted in the body.

6. The mobile cleaning robot of claim 4, wherein the sensor comprises a capacitive sensor, the capacitive sensor comprising a first capacitive plate in a fixed location relative to the bumper and a second capacitive plate in a fixed location relative to the body, the first capacitive plate being movable relative to the second capacitive plate when the bumper moves relative to the body.

7. The mobile cleaning robot of claim 4, wherein the sensor comprises an inductive sensor.

8. The mobile cleaning robot of claim 4, wherein the sensor is a first sensor and the signal is a first signal, and wherein the robot further comprises:
a second sensor to produce a second signal in response to movement of the bumper relative to the body, the second signal varying linearly with the movement of the bumper;
wherein the operations further comprise calculating the value based on a first value that is based on the first signal and a second value that is based on the second signal.

9. The mobile cleaning robot of claim 8, wherein the body comprises a left side, a right side, a front, and a back;
wherein the first sensor is adjacent to the right side and the second sensor is adjacent to the left side; and
wherein the bumper is located along the front of the robot and extends partially along at least a portion of the left side and at least a portion of the right side.

10. The mobile cleaning robot of claim 4, wherein the bumper being positioned outside of the predefined range is indicative of the bumper being compressed further than an amount of compression associated with the predefined range.

11. The mobile cleaning robot of claim 4, wherein the operations further comprise controlling the robot to turn toward the wall surface in response to the value indicating that the bumper is positioned below the predefined range.

12. The mobile cleaning robot of claim 4, wherein the body comprises wheels;
wherein the robot further comprises detectors associated with the wheels, the detectors for detecting speed of the wheels; and
wherein controlling the robot comprises controlling the robot based, at least in part, on the speed of the wheels being less than a predetermined speed and the value indicating that the bumper is positioned outside of the predefined range.

13. The mobile cleaning robot of claim 4, wherein the operations further comprise dynamically calibrating the value to a neutral position of the bumper relative to the body.

14. The mobile cleaning robot of claim 13, wherein dynamically calibrating the value to the neutral position of the bumper comprises determining the neutral position of the bumper relative to the body while the robot moves around a floor surface absent contact with the wall surface.

15. The mobile cleaning robot of claim 1, wherein the body comprises a left side, a right side, a front, and a back, the bumper being located along the front of the body and extending at least along at least a portion of the left side and at least a portion of the right side; and
wherein the robot further comprises:
a first sensor adjacent to the right side to produce a first signal in response to movement of the bumper relative to the body;
a second sensor adjacent to the left side to produce a second signal in response to the movement of the bumper; and a third sensor to produce a third signal in response to the movement of the bumper, the third signal varying linearly with the movement of the bumper;
wherein the third sensor is between the left side and the right side, and the third sensor is adjacent to the front.

16. The mobile cleaning robot of claim 15, wherein the operations further comprise:
detecting movement of the bumper relative to the body along a first axis perpendicular to the front of the body based on the first and the second signals, and
detecting movement of the bumper relative to the body along a second axis parallel to the front of the body based on the third signal.

17. The mobile cleaning robot of claim 16, wherein the first and second sensors are positioned to be responsive to the movement of the bumper relative to the body along the first axis, and the third sensor is positioned to be responsive to the movement of the bumper relative to the body along the second axis.

18. The mobile cleaning robot of claim 1, wherein:
advancing the robot along the first portion of the wall surface comprises traversing a perimeter region adjacent the wall surface in a room, and
the operations further comprise controlling the robot to traverse an open area within the perimeter region of the room.

19. The mobile cleaning robot of claim 18, wherein the operations further comprise:
after traversing the perimeter region and after controlling the robot to traverse at least a first portion of the open area, determining that a second portion of the open area of the room is untraversed after, and
controlling the robot to traverse the second portion of the open area after determining the second portion of the open area is untraversed.

20. The mobile cleaning robot of claim 1, further comprising a sensor to provide a value indicative of an amount of compression of the bumper,
wherein causing the bumper to be positioned within the predefined range comprises causing the bumper to be positioned within the predefined range based on the value indicative of the amount of compression of the bumper,
wherein controlling the robot comprises controlling the robot in response to the value indicative of the amount of compression of the bumper being indicative of contact between the bumper and an obstacle.

21. The mobile cleaning robot of claim 20, wherein the sensor is configured such that the value provided when the bumper is positioned within the predefined range varies with respect to the value provided when the bumper is in the fully compressed position and the value provided when the bumper is in the fully uncompressed position.

22. A mobile cleaning robot comprising:
a body movable relative to a wall surface;
a bumper movable relative to the body between a fully uncompressed position and a fully compressed position;
a cleaning pad removably attached to a bottom of the body and
a controller to execute instructions to perform operations comprising:
in response to the bumper being positioned between a predefined range of compression and the fully compressed position when the bumper contacts a wall surface, controlling the robot to retreat from the wall surface until the bumper is positioned between the predefined range and the fully uncompressed position, turn away from the wall surface, engage the wall surface such that the bumper is positioned within the predefined range, and then advance along the wall surface while causing the bumper to be positioned within the predefined range to maintain an angle between the robot and the wall surface and to maintain contact between the cleaning pad and the wall surface.

23. The mobile cleaning robot of claim 22, wherein:
controlling the robot to advance along the wall surface comprises controlling the robot so that at least one of a right side and a left side of the body is non-parallel to the wall surface.

24. The mobile cleaning robot of claim 22, wherein:
the robot further comprises a sensor to produce a signal in response to movement of the bumper relative to the body caused by contact between the bumper and the wall surface, the signal varying linearly with the movement of the bumper; and advancing the robot along the wall surface comprises advancing the robot along the wall surface based at least in part on a value indicative of an amount of compression of the bumper, the value being based on the signal and indicating that the bumper is positioned within the predefined range.

25. The mobile cleaning robot of claim 24, wherein the bumper being positioned outside of the predefined range is indicative of the bumper being compressed further than an amount of compression associated with the predefined range.

26. The mobile cleaning robot of claim 24, wherein the operations further comprise controlling the robot to turn toward the wall surface in response to the value indicating that the bumper is positioned below the predefined range.

27. The mobile cleaning robot of claim 22, further comprising a sensor to provide a value indicative of an amount of compression of the bumper, wherein causing the bumper to be positioned within the predefined range comprises causing the bumper to be positioned within the predefined range based on the value indicative of the amount of compression of the bumper, wherein controlling the robot comprises controlling the robot in response to the value indicative of the amount of compression of the bumper being indicative of contact between the bumper and an obstacle.

28. The mobile cleaning robot of claim 27, wherein the sensor is configured such that the value provided when the bumper is positioned within the predefined range varies with respect to the value provided when the bumper is in the fully compressed position and the value provided when the bumper is in the fully uncompressed position.

* * * * *

UNITED STATES PATENT AND TRADEMARK OFFICE
CERTIFICATE OF CORRECTION

PATENT NO. : 9,877,630 B2  
APPLICATION NO. : 14/946500  
DATED : January 30, 2018  
INVENTOR(S) : Brian Wolfe and Ping-Hong Lu Page 1 of 1

It is certified that error appears in the above-identified patent and that said Letters Patent is hereby corrected as shown below:

In the Claims

Column 27, Line 25, in Claim 9, after "extends" delete "partially".

Signed and Sealed this  
Tenth Day of April, 2018

Andrei Iancu  
*Director of the United States Patent and Trademark Office*